US011244186B2

(12) United States Patent
Horiike et al.

(10) Patent No.: US 11,244,186 B2
(45) Date of Patent: Feb. 8, 2022

(54) INFORMATION PROCESSING APPARATUS, METHOD AND STORAGE MEDIUM

(71) Applicant: CANON KABUSHIKI KAISHA, Tokyo (JP)

(72) Inventors: Norikazu Horiike, Tokyo (JP); Ruriko Kawano, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 16/819,275

(22) Filed: Mar. 16, 2020

(65) Prior Publication Data
US 2020/0311454 A1    Oct. 1, 2020

(30) Foreign Application Priority Data

Mar. 29, 2019    (JP) .............................. JP2019-067752

(51) Int. Cl.
*G06K 9/20*    (2006.01)
*G06K 9/00*    (2022.01)
*G06T 11/60*    (2006.01)

(52) U.S. Cl.
CPC ....... *G06K 9/2081* (2013.01); *G06K 9/00671* (2013.01); *G06T 11/60* (2013.01); *G06T 2210/22* (2013.01)

(58) Field of Classification Search
None
See application file for complete search history.

(56) References Cited

U.S. PATENT DOCUMENTS

| 6,724,915 | B1* | 4/2004 | Toklu ..................... G06T 7/248 382/103 |
| 6,744,905 | B1 | 6/2004 | Horiike |
| 6,983,420 | B1* | 1/2006 | Itou ....................... G11B 27/034 715/723 |
| 2009/0054755 | A1* | 2/2009 | Shiibashi ............... G16H 15/00 600/407 |
| 2010/0157064 | A1* | 6/2010 | Cheng ................... H04N 5/247 348/169 |
| 2010/0220891 | A1* | 9/2010 | Lefevre .................. G06T 7/20 382/103 |
| 2011/0249861 | A1* | 10/2011 | Tokutake ............... G11B 27/10 382/103 |
| 2012/0026381 | A1* | 2/2012 | Lee ................... H04N 5/232945 348/333.12 |

(Continued)

FOREIGN PATENT DOCUMENTS

JP    2008-004061 A    1/2008
JP    4769653 B2    9/2011

Primary Examiner — Jwalant Amin
(74) Attorney, Agent, or Firm — Venable LLP

(57) ABSTRACT

The information processing apparatus in one embodiment of the present invention is an information processing apparatus for selecting an image from among a plurality of images in response to instructions of a user and having: a reception unit configured to receive specification of an object on one image of the plurality of images; a detection unit configured to detect the object from each of the plurality of images; a display unit configured to display an area corresponding to the detected object of each of the plurality of images so that the area is emphasized more than the other areas in each of the plurality of images; and a selection unit configured to select one of the plurality of images in response to the instructions by a user after the display by the display unit.

17 Claims, 28 Drawing Sheets

(56) References Cited

U.S. PATENT DOCUMENTS

2015/0029304 A1* 1/2015 Park ................... H04N 5/23238
348/36
2016/0147792 A1* 5/2016 Oh .......................... G06F 21/30
707/723

* cited by examiner

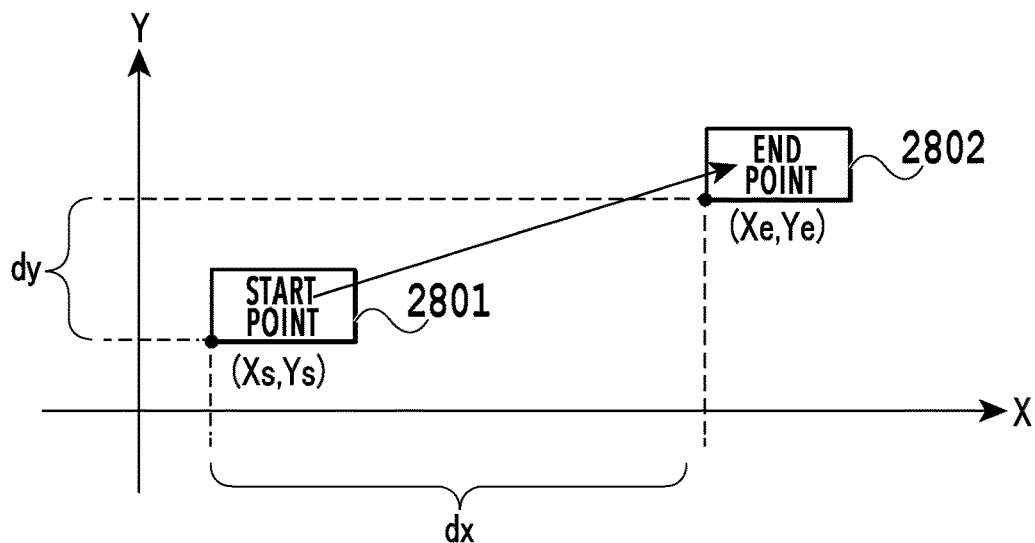
FIG.28A
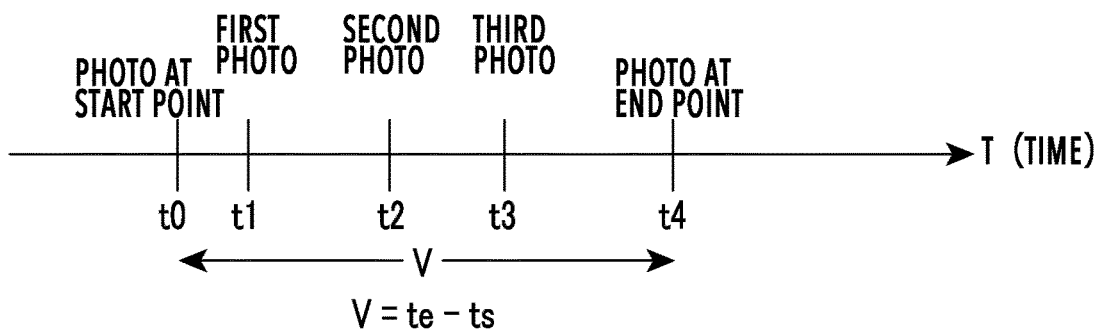
FIG.28B
| PHOTO id | TIME | ELAPSED TIME | OFFSET X | OFFSET Y |
|---|---|---|---|---|
| 0 | t0 | 0 | 0 | 0 |
| 1 | t1 | t1-t0 | (t1-t0)/v*dx | (t1-t0)/v*dy |
| 2 | t2 | t2-t0 | (t2-t0)/v*dx | (t2-t0)/v*dy |
| 3 | t3 | t3-t0 | (t3-t0)/v*dx | (t3-t0)/v*dy |
| 4 | t4 | t4-t0 | (t4-t0)/v*dx | (t4-t0)/v*dy |
FIG.28C

INFORMATION PROCESSING APPARATUS, METHOD AND STORAGE MEDIUM

BACKGROUND OF THE INVENTION

Field of the Invention

The present disclosure relates to an information processing apparatus for selecting a specific image from among a plurality of images, a method, and a storage medium.

Description of the Related Art

There exists a desire to easily select a specific image from among a plurality of images captured consecutively by a moving image capturing or consecutive image capturing. For example, such a desire exists in a case where an image intended by a user is selected at the time of creating a photo album.

Incidentally, there is a technique to automatically detect the face of a person and display a frame indicating the detected face. Japanese Patent No. 4769653 has disclosed a method of taking the average size of detection areas of a plurality of images as a detection frame. It is considered that by displaying a specific area (face of a person, or the like) automatically detected within an image as described above, image selection by a user is made easier.

SUMMARY OF THE INVENTION

However, in a case where the face is automatically detected and taken as a specific area as in the technique described in Japanese Patent No. 4769653, there is a possibility that an area different from the area intended by a user is specified. For example, even in a case where a user focuses attention on a desired person, there is a possibility that the face of another person is specified. In this case, on a condition that the area that is not the area on which a user desires to focus attention is emphasized more than or equal to the area on which a user originally desires to focus attention, the image selection by a user becomes more difficult instead.

One embodiment of the present invention has been made in view of the problem such as this, and an object thereof is to make it easier to select an image intended by a user from among a plurality of images.

In one embodiment of the present invention, the information processing apparatus for selecting an image from among a plurality of images in response to instructions of a user has: a reception unit configured to receive specification of an object on one image of the plurality of images; a detection unit configured to detect the object from each of the plurality of images; a display unit configured to display an area corresponding to the detected object of each of the plurality of images so that the area is emphasized more than the other areas in each of the plurality of images; and a selection unit configured to select one of the plurality of images in response to the instructions by a user after the display by the display unit.

Further features of the present invention will become apparent from the following description of exemplary embodiments with reference to the attached drawings.

BRIEF DESCRIPTION OF THE DRAWINGS

FIG. 28A to FIG. 28C are diagrams explaining interpolation processing in the first embodiment.

DESCRIPTION OF THE EMBODIMENTS

In the following, with reference to the attached drawings, embodiments of the present invention are explained in detail. The following embodiments are not intended to limit the invention relating to the scope of the claims and all combinations of features explained in the present embodiments are not necessarily indispensable to the solution of the present invention. The same symbol is attached to the same configuration.

In the following embodiments, a system is explained as an example, in which photos selected by a user are automatically laid out and a photo album (photo book) is generated, but the present invention is not limited to this. For example, it may also be possible to make use of an image editing application to select an image desired by a user from among a plurality of images. The photo album is also referred to simply as an album.

First Embodiment

Figure 1:
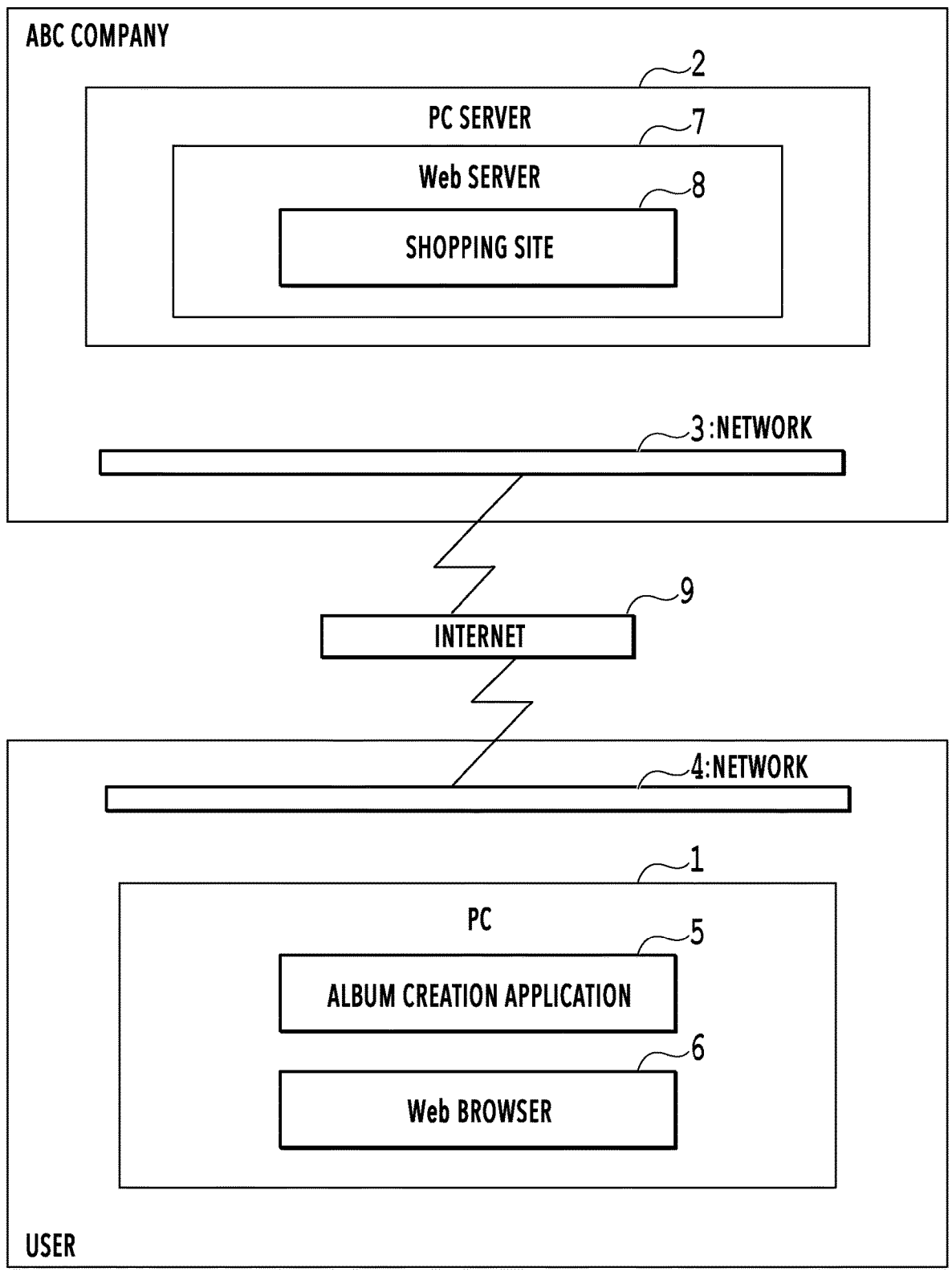
FIG. 1 is a diagram showing a configuration example of a photo album creation/order system in a first embodiment.

FIG. 1 shows a configuration example of an information processing system for photo album creation/order in the present embodiment. As shown in FIG. 1, the information processing system has an information processing apparatus 1 used by a user and an information processing apparatus 2 of a company creating a photo album. As the information processing apparatus 1, for example, it is possible to use a general personal computer (hereinafter, there is a case where this is abbreviated to PC). As the information processing apparatus 2, for example, it is possible to use a PC server. In the information processing apparatus 1 and the information processing apparatus 2, as the Operating System (hereinafter, referred to as OS), for example, Windows (registered trademark) 8, Windows Server 2012, or the like is installed. The information processing apparatus 1 and the information processing apparatus 2 are connected to networks 3 and 4, respectively, which include Ethernet (registered trademark), and further connected to each other so as to be capable of communication via an internet 9.

In the information processing apparatus 1, a photo album creation application (hereinafter, referred to as album creation application) 5 is installed. The album creation application 5 includes, for example, a file in an executable format for Windows (*.EXE). The album creation application 5 operates by the information processing apparatus 1 executing the file in the executable format.

Further, in the information processing apparatus 1, a Web browser application (hereinafter, referred to as Web browser) 6 is installed. The Web browser 6 is used at the time of making use of World Wide Web (hereinafter, referred to as WWW).

The album creation application 5 is not limited to that installed in advance in the information processing apparatus 1 and may be a Web application executed on the Web browser 6 of the information processing apparatus 1. In a case of the Web application, a predetermined Web site is accessed and a program is read.

The network 4 is a network for a user who uses the information processing apparatus 1 and is, for example, a home network for general household use.

The information processing apparatus 2 comprises a Web server 7 comprising the function of a Web server and provides the Web site of a company (referred to as ABC company) via the internet 9. The network 3 is, for example, an office network constructed within the company.

A shopping site 8 is a shopping site in which the ABC company provides services for users. It is possible for a user to order a photo album by making use of the shopping site 8.

Figure 2:
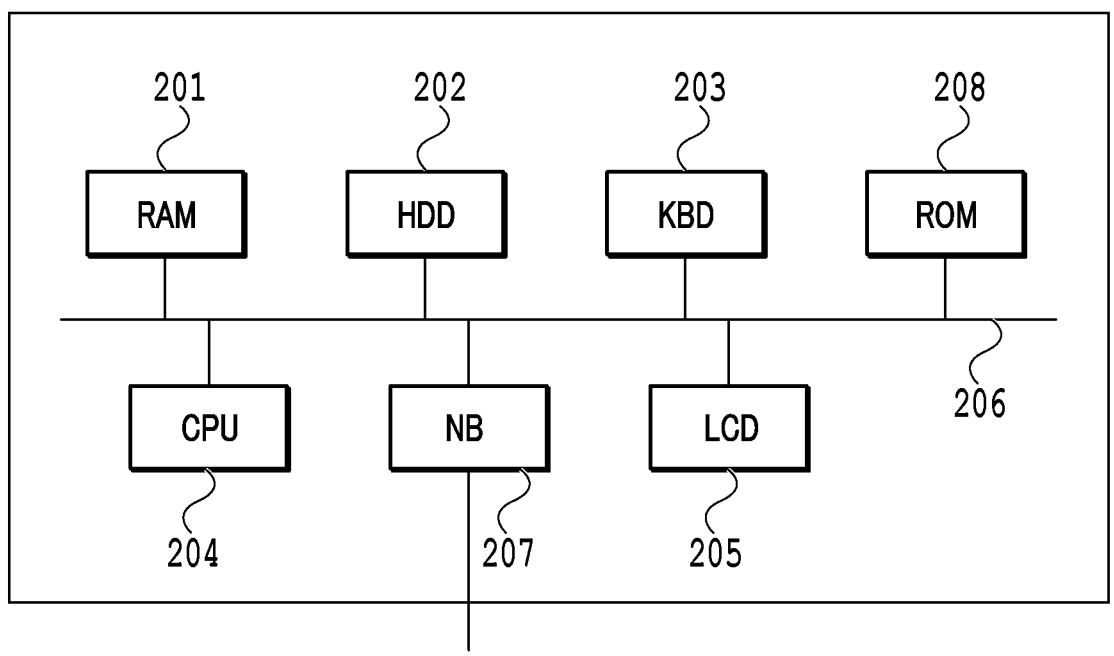
FIG. 2 is a diagram showing a hardware configuration example of an information processing apparatus in the first embodiment.

FIG. 2 shows a hardware configuration example of the information processing apparatus 1 and the information processing apparatus 2 in the present embodiment. As shown in FIG. 2, the information processing apparatus 1 has a CPU 204, a ROM 208, a RAM 201, an HDD 202, a KBD 203, an LCD 205, and an NB 207 and each component is connected by a bus 206.

The CPU (Central Processing Unit) 204 reads a control program stored in the ROM 208 or the HDD 202 into the RAM 201 and executes the control program. The CPU 204 is a control unit configured to control the operations of the entire information processing apparatus.

The RAM 201 is a random access memory and provides a temporary storage area at the time of the CPU 204 executing the control program.

The ROM 208 stores the control program executed by the CPU 204.

The HDD (Hard Disk Drive) 202 is a storage unit configured to store image data, processing results of image analysis, and the like. The HDD 202 stores programs, such as the album creation application 5 and the Web browser 6.

The KBD (keyboard) 203 is an event board unit. That is, the KBD 203 is an input unit of a user operation. The KBD 203 may include another input device, such as a mouse. It is possible for a user to input instructions to the information processing apparatus by performing a click operation by operating a mouse pointer on various screens provided by the album creation application 5 and on the Web browser 6.

The LCD (Liquid Crystal Display) 205 is a display unit of the information processing apparatus. The display unit is not limited to a liquid crystal display and may be another display.

The NB (Network Board) 207 is a communication control unit and is a device for communicating with an external device, such as a printer and a sever.

As above, the hardware configuration example of the information processing apparatus is explained, but the hardware configuration example is not limited to this.

Figure 3:
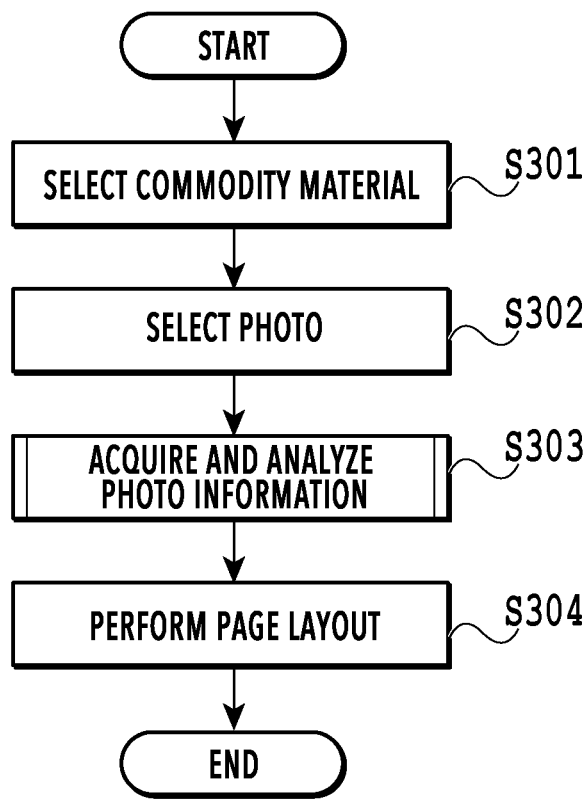
FIG. 3 is a flowchart of photo album creation processing in the first embodiment.

FIG. 3 shows a flowchart of photo album creation processing in the present embodiment. The series of processing shown in the flowchart is performed by the CPU 204 loading the control program stored in the ROM 208 or the HDD 202 into the RAM 201 and executing the control program. Alternatively, it may also be possible to implement a part or all of the functions of the steps in the flowchart by hardware, such as ASIC and an electronic circuit. Further, symbol "S" in the explanation of each piece of processing means a "step" in the flowchart. This also applies to the other flowcharts.

At S301, the album creation application 5 displays a commodity material selection screen for selecting a commodity material used for an album and acquires the commodity material selected by a user.

At S302, the album creation application 5 displays a photo selection screen for selecting a photo to be included in an album and acquires image data of the photo selected by a user. For example, in a case where the image data is stored within a specific folder of the information processing apparatus 1, a user may select the folder.

At S303, the album creation application 5 acquires information, such as the image capturing date, from the image data of the photo selected by a user and analyzes the information.

At S304, the album creation application 5 generates album data by performing the page layout of the album based on the results of analyzing the information, such as the image capturing date.

Figure 4:
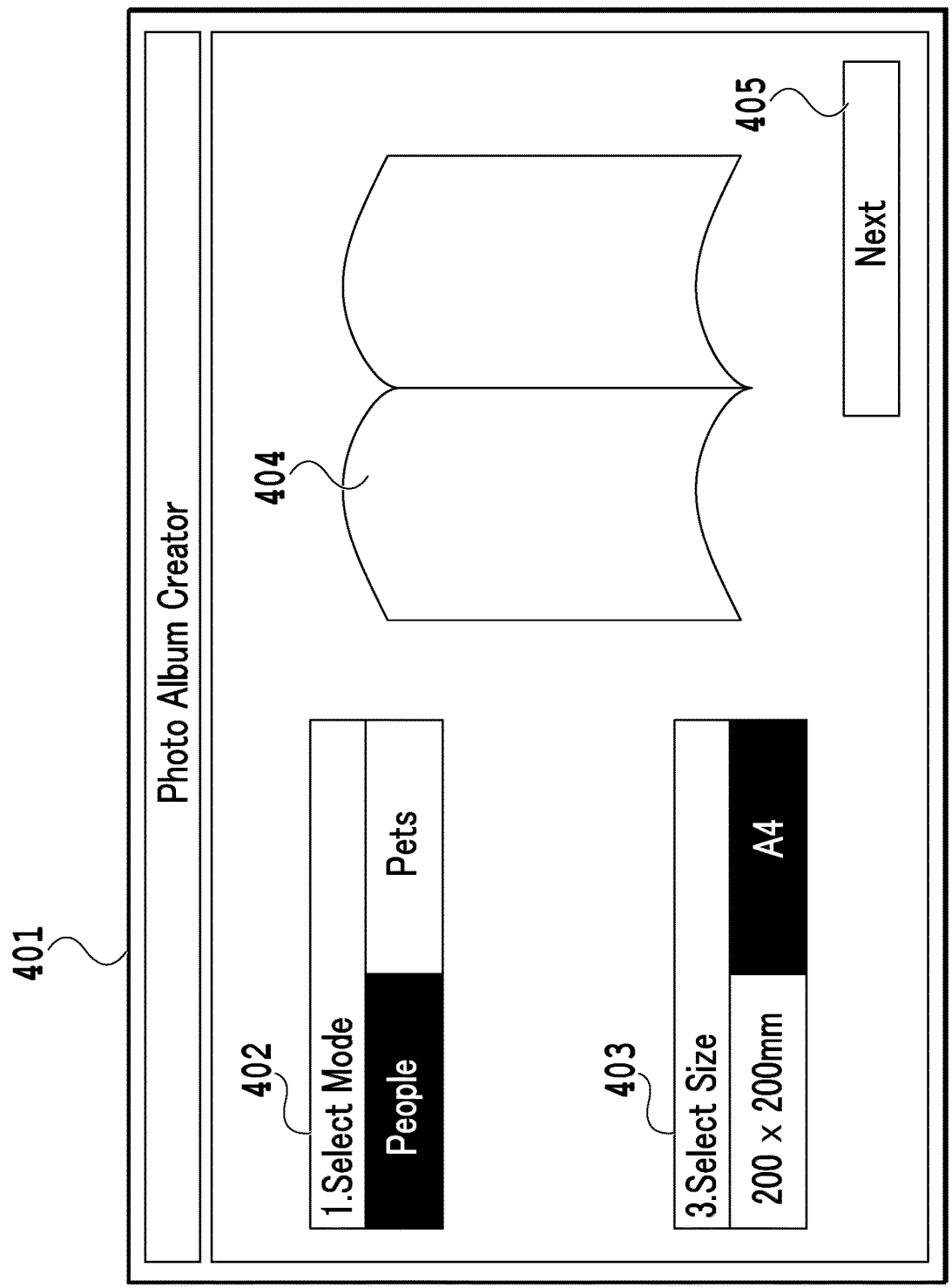
FIG. 4 is a diagram showing an example of a commodity material selection screen in the first embodiment.

The generated album data is displayed on the LCD 205. Further, the album data is transmitted to the information processing apparatus 2 via the internet 9. It is possible for the information processing apparatus 2 to generate print data by using the received album data, perform printing by making use of a printing apparatus, and generate a book-bound photo album made of paper media. FIG. 4 shows an example of a commodity material selection screen 401 that is displayed at S301.

In a Select Mode list 402, it is possible for a user to select either a People mode or a Pets mode. In the People mode, photos including a person are selected from among the photos selected by a user and the photos are laid out in the album. Further, in the Pets mode, photos including a pet are selected from among the photos selected by a user and the photos are laid out in the album. In the example in FIG. 4, the People mode is selected.

In a Select Size list 403, it is possible for a user to select the size of the album. In the example in FIG. 4, the A4 size is selected from the 200×200 mm size and the A4 size, which are selectable.

The album creation application 5 generates an album complete image 404 based on the information selected in the Select Mode list 402 and the Select Size list 403. In a case where a user makes a selection anew in the Select Mode list 402 or in the Select Size list 403, the album creation application 5 changes the album complete image 404 in accordance therewith. For example, in the state in FIG. 4, in a case where a user selects the Pets mode in the Select Mode list 402 and selects the 200×200 mm size in the Select Size list 403, the album complete image 404 changes into a square complete image in which pet photos are laid out.

In a case where a user clicks a Next button 405, the information selected on the commodity material selection screen 401 is determined.

In the example described above, the commodity material is selected in the Select Mode list 402 and the Select Size list 403, but the example is not limited to this. For example, it may also be possible to enable a user to select a design of an album and specify the number of pages on the commodity material selection screen 401.

Figure 5:
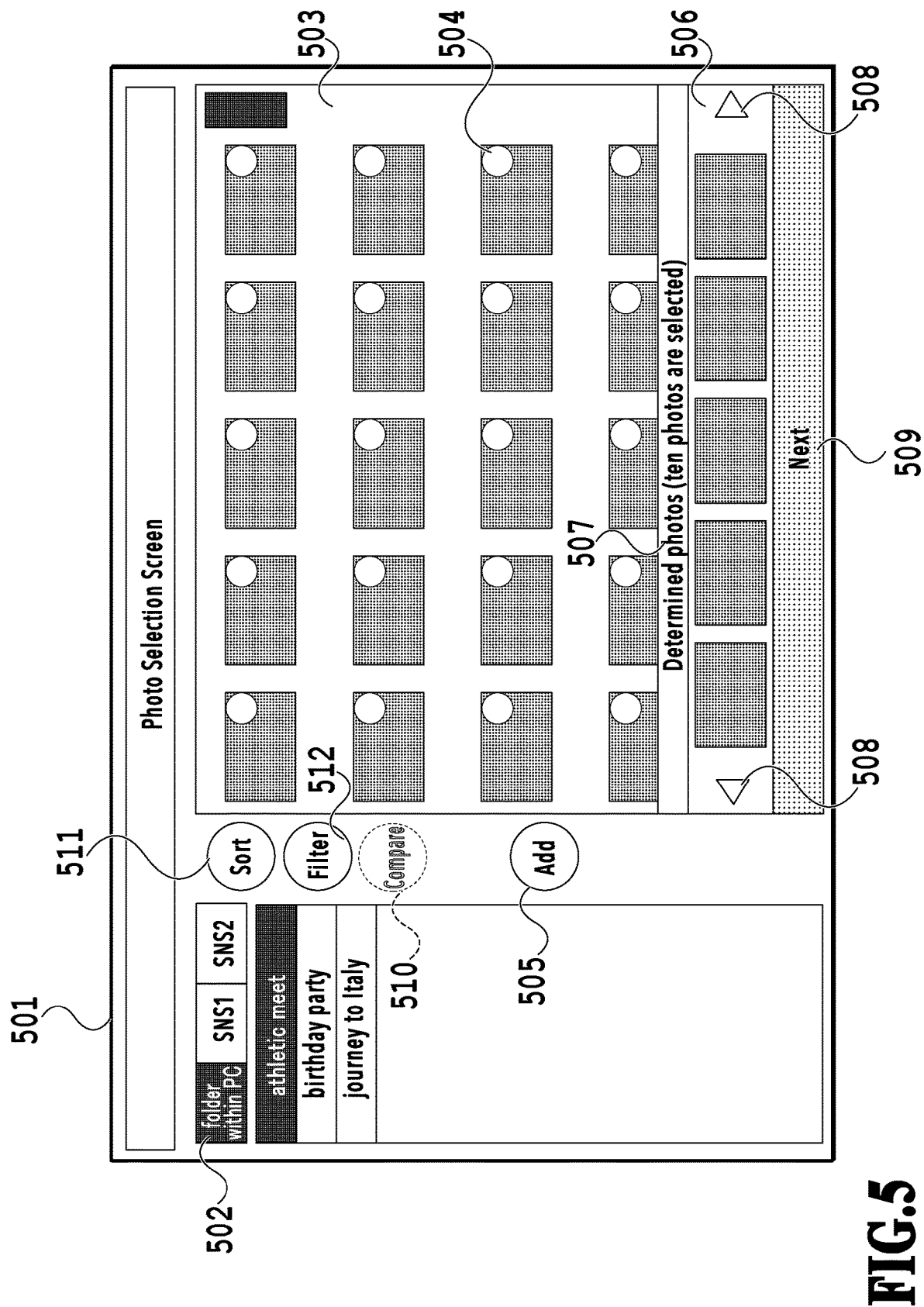
FIG. 5 is a diagram showing an example of a photo selection screen in the first embodiment.

FIG. 5 shows an example of a photo selection screen that is displayed at S302.

After a user clicks the Next button 405 on the commodity material selection screen 401, the screen makes the transition to Photo Selection Screen 501.

It is possible for a user to select the source from which a photo is acquired in an area 502. As shown in FIG. 5, for example, it is possible for a user to select a folder within the PC (that is, the information processing apparatus 1) where the album creation application 5 is being operated or the social network service (hereinafter, referred to as SNS) as the source from which a photo is acquired. In a case where a user selects "folder within PC" in the area 502, folders included within the PC are displayed. In the example in FIG. 5, as selectable folders, three folders whose names are "athletic meet", "birthday party", and "journey to Italy" are displayed and the state is such that the "athletic meet" folder is selected.

The album creation application 5 displays a thumbnail of the photos included in the folder selected in the area 502 in a list in an area 503.

In a case where a user selects a Sort button 511, it is possible to sort and display the photos in accordance with a predetermined reference, for example, such as the photo name, the photo size, and the image capturing date. Further, in a case where a user selects a Filter button 512, it is possible to display only the photos filtered based on a predetermined filtering condition.

In a case where a user selects a photo displayed in the area 503, a checkbox 504 of the selected photo is checked.

In a case where a user selects an Add button 505, the photo selected in the area 503 (that is, the photo whose checkbox is checked) is added to an area 506 as the photo determined to be used for the album. It is also possible to add the photo selected in the area 503 to the area 506 by dragging and dropping the photo. In the example in FIG. 5, it is indicated that a number of determined photos 507 is ten.

It is possible for a user to display the determined photo that is not displayed in the area 506 by clicking scroll buttons 508 provided at both the left and the right ends of the area 506. In the example in FIG. 5, only the five photos are displayed in the area 506, but it is possible to use the scroll buttons 508 in order to display the remaining five photos.

In a case where a user clicks a "Next" button 509 on Photo Selection Screen 501, the photo selection is completed. That is, the photos corresponding to the thumbnail displayed in the area 506 are determined to be the photos for the photo album.

Here, a method of selecting a photo desired by a user from among a plurality of similar photos (hereinafter, also referred to as similar photos) is explained. The similar photos may be a plurality of photos whose checkboxes are checked by a user on Photo Selection Screen 501. Further, the similar photos may include consecutively captured photos, which are a plurality of photos captured consecutively. It is possible for the album creation application 5 in the present embodiment to make it easier for a user to select a desired photo by tracking an object specified by a user from the similar photos and emphasizing the detected object.

Figure 18:
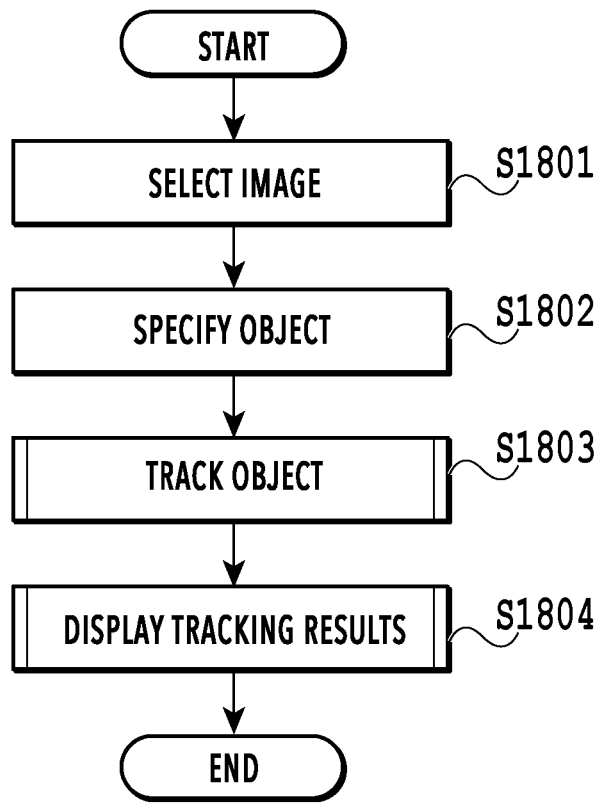
FIG. 18 is a general flowchart of object tracking processing in the first embodiment.

FIG. 18 shows a flowchart of object tracking processing in the present embodiment.

At S1801, the album creation application 5 causes a user to select an image from among a group of images whose checkboxes are checked by a user on Photo Selection Screen 501.

Figure 6:
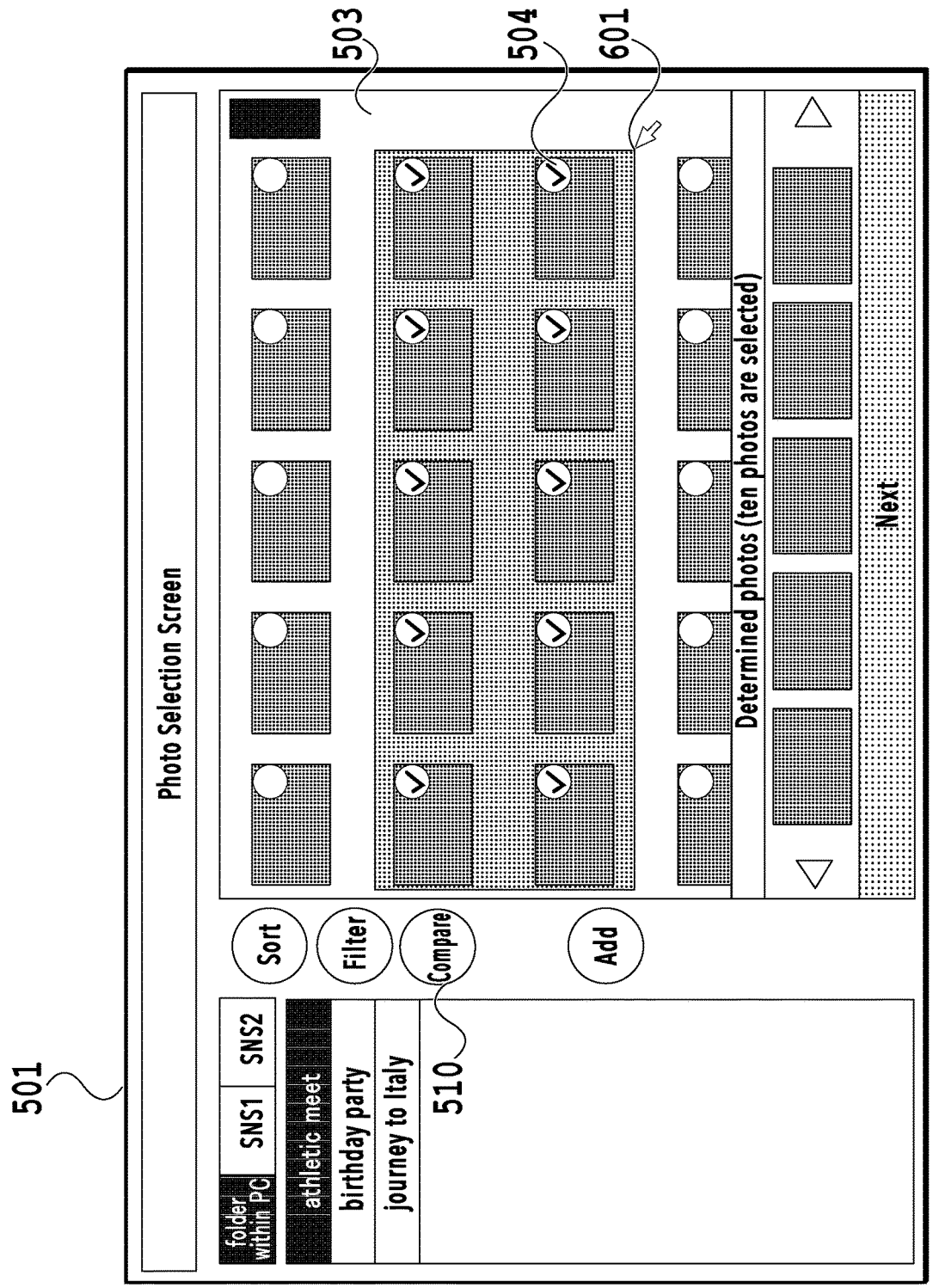
FIG. 6 is a diagram showing an example of the photo selection screen in the first embodiment.

FIG. 6 shows the state where the checkboxes of a plurality of images are checked by a user on Photo Selection Screen 501. In FIG. 6, the checkboxes 504 of a plurality of images 601 are checked in the area 503. On Photo Selection Screen 501 shown in FIG. 5, a Compare button 510 is invalid, but the Compare button 510 becomes valid in response to that the checkbox 504 is checked. In a case where a user clicks the Compare button 510 in the state where the Compare button 510 is valid, the screen makes the transition to a photo comparison screen, to be described later by using FIG. 8, for comparing the selected images whose checkboxes are checked. It may also be possible for the Compare button 510 to be invalid in a case where only the one checkbox 504 is checked and to become valid in response to that the two or more checkboxes are checked. In this case, it may also be possible for the Compare button 510 to become invalid again in a case where the checked checkbox is cancelled and the state where only the one checkbox is checked is returned.

Figure 7:
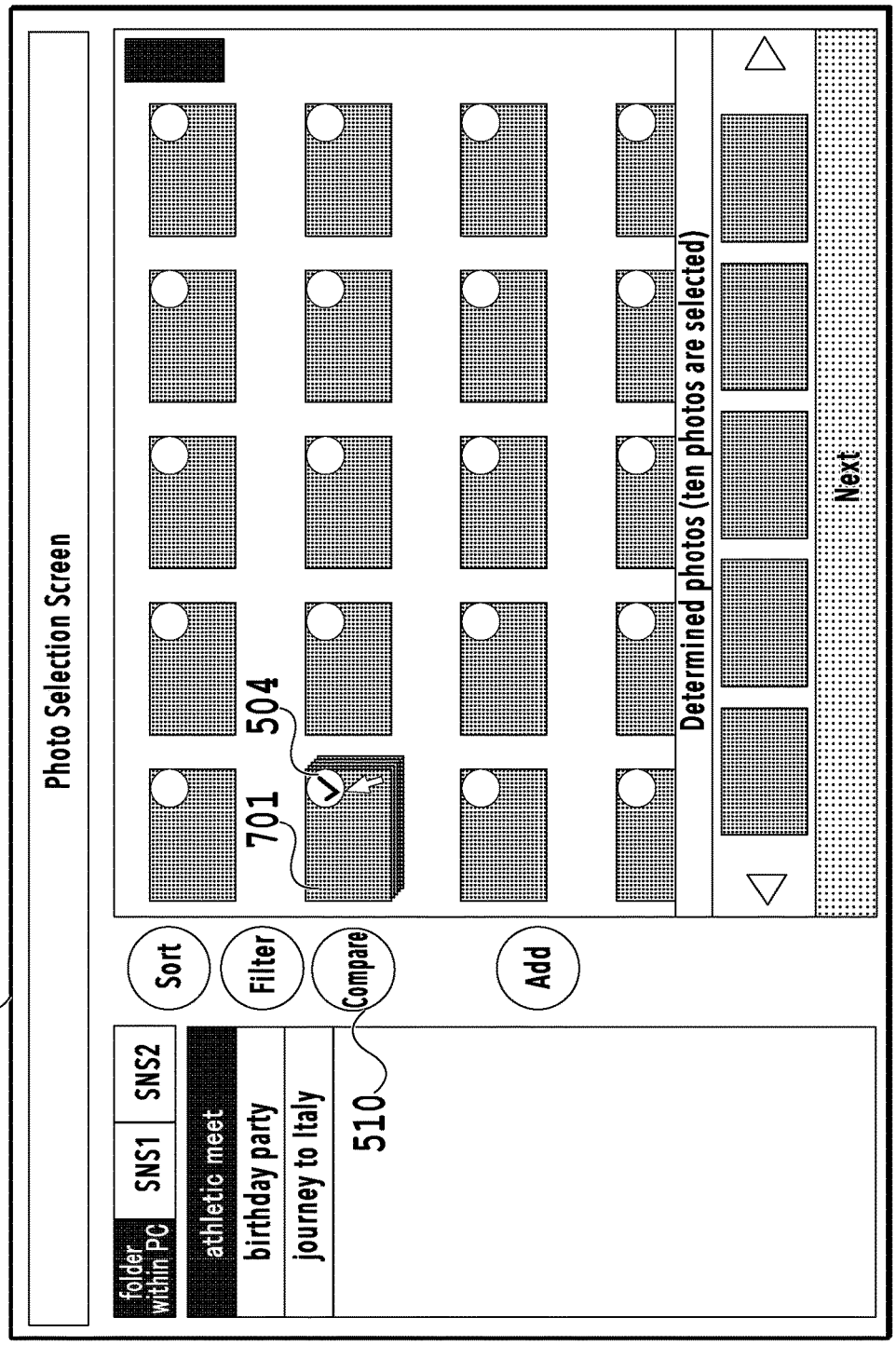
FIG. 7 is a diagram showing an example of the photo selection screen in the first embodiment.

Further, in FIG. 7, on Photo Selection Screen 501, consecutively captured photos 701 are put together and displayed in the stacked state. In FIG. 7, the checkbox 504 of the consecutively captured photos 701 is checked and the plurality of photos put together in the stacked state is selected by a user. In a case where a user clicks the Compare button 510 in this state, the screen makes the transition to another photo comparison screen, to be described later by using FIG. 8, for comparing the consecutively captured photos 701 whose checkbox is checked (that is, selected images).

Here, processing to specify the consecutively captured photos 701 put together and displayed in the stacked state on Photo Selection Screen 501 in FIG. 7 is explained.

Figure 26:
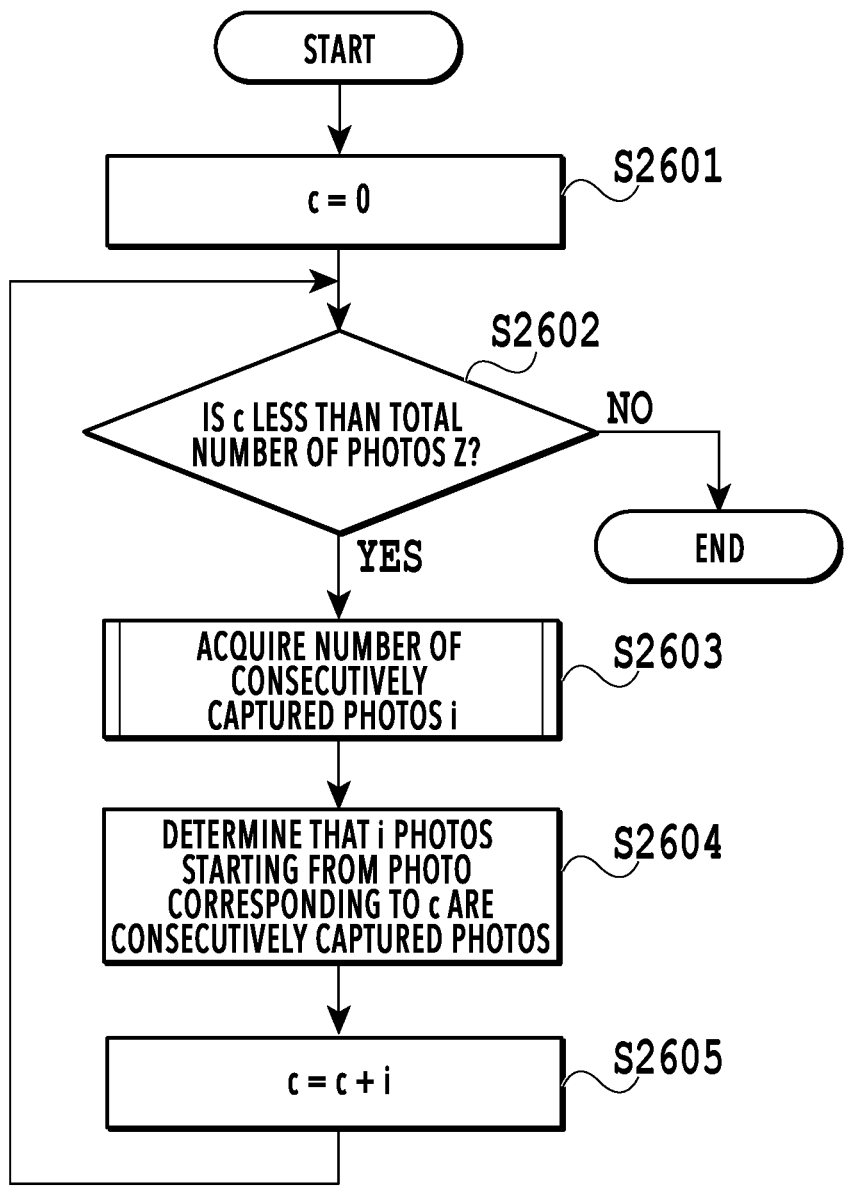
FIG. 26 is a general flowchart of consecutively captured photo specification processing in the first embodiment.

FIG. 26 shows a general flowchart of consecutively captured photo specification processing. The consecutively captured photo specification processing is performed at the time of displaying Photo Selection Screen 501.

At S2601, the album creation application 5 initializes a counter value c (c=0).

At S2602, the album creation application 5 compares the counter value c with a total number of photos Z displayed on Photo Selection Screen 501. In a case where the counter value c is less than the total number of photos Z, the processing advances to S2603. On the other hand, in a case where the counter value c is larger than or equal to the total number of photos Z, the processing is terminated.

At S2603, the album creation application 5 performs consecutively captured photo determination processing and acquires a number of consecutively captured photos i. The consecutively captured photo determination processing will be described later.

At S2604, the album creation application 5 determines that the i photos starting from the photo corresponding to the counter value c are the consecutively captured photos. Here, it is assumed that the photo corresponding to a case where the counter value c is 0 is the first photo.

At S2605, the album creation application 5 updates the counter value c (c=c+i).

Figure 27:
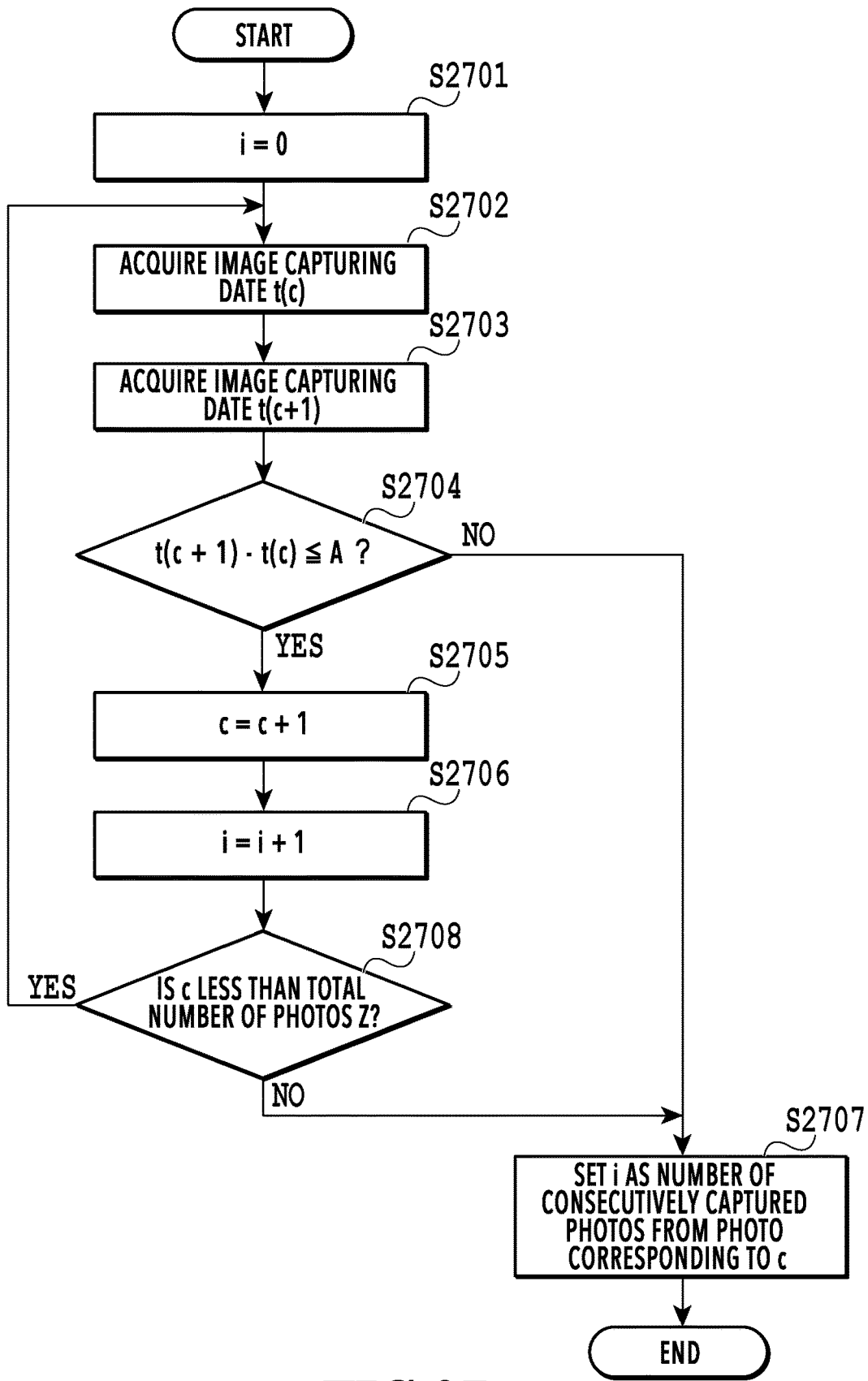
FIG. 27 is a flowchart of consecutively captured photo determination processing in the first embodiment.

Following the above, with reference to FIG. 27, the consecutively captured photo determination processing at S2603 is explained.

At S2701, the album creation application 5 initializes the number of consecutively captured photos i (i=0).

At S2702, the album creation application 5 acquires an image capturing date t (c) from Exif information on the photo corresponding to the counter value c. It is assumed that the photo corresponding to a case where the counter value c is 0 is the first photo.

At S2703, the album creation application 5 acquires an image capturing date t (c+1) from the Exif information on the photo corresponding to a counter value c+1. It may also be possible to acquire the image capturing date from the file attribute.

At S2704, the album creation application 5 calculates the difference between the image capturing dates of the two photos described previously and compare the difference with a threshold value A that is set in advance. In a case where the difference between the image capturing dates is less than or equal to the threshold value A, it is determined that the two photos are consecutively captured photos and the processing advances to S2705. On the other hand, in a case where the difference between the image capturing dates is larger than the threshold value A, it is determined that the two photos are not consecutively captured photos and the processing advances to S2707.

At S2707, the album creation application 5 sets the number of consecutively captured photos i as the number of consecutively captured photos from the photo corresponding to the counter value c.

At S2705, the album creation application 5 increments the counter value c (c=c+1).

At S2706, the album creation application 5 increments the number of consecutively captured photos i (i=i+1).

At S2708, the album creation application 5 compares the counter value c with the total number of photos Z. In a case where the counter value c is less than the total number of photos Z, the processing returns to S2702 and the processing is repeated. On the other hand, in a case where the counter value c is larger than or equal to the total number of photos Z, the processing advances to S2707.

As explained above, in the present embodiment, the group of photos whose differences between the image capturing dates are included within a specific time is specified as the consecutively captured photos and the photo group is put together and displayed in the stacked state on Photo Selection Screen 501 in FIG. 7.

Figure 8:
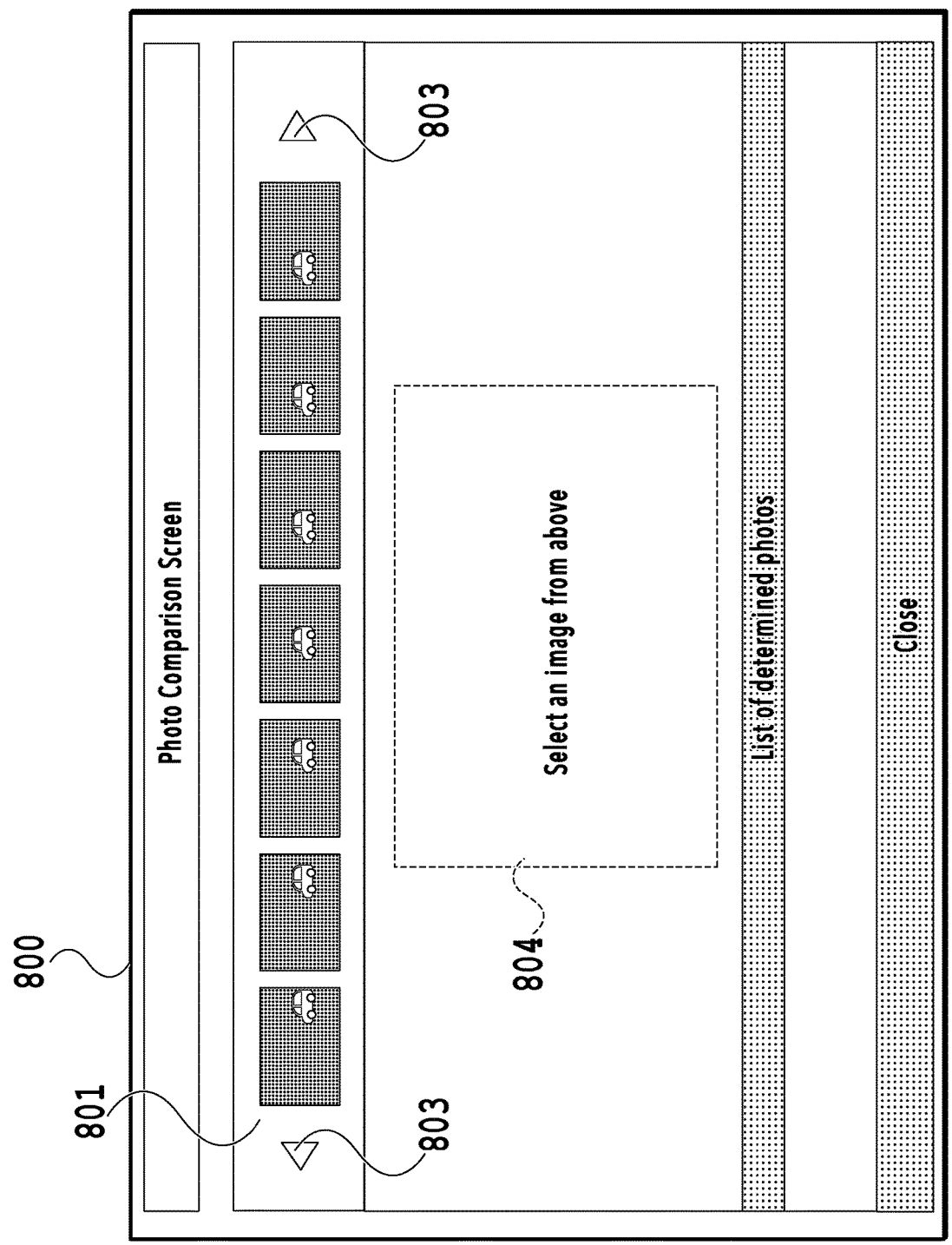
FIG. 8 is a diagram showing an example of a photo comparison screen in the first embodiment.

FIG. 8 shows an example of a photo comparison screen in the present embodiment. Photo Comparison Screen 800 is displayed in a case where there are instructions for the Compare button 510 on Photo Selection Screen 501 in FIG. 6 or FIG. 7. In a case where there are instructions for the Compare button 510 in the state where Photo Selection Screen 501 in FIG. 6 is displayed, the photos that are selected by the checkboxes thereof being checked are displayed side by side in a list in an area 801. That is, the album creation application 5 arranges the similar photos side by side in a list in the area 801. At this time, the order of arrangement of the photos in the area 801 may be the order of the checkbox thereof being checked by a user or the order of the image capturing date of the photo. On the other hand, in a case where there are instructions for the Compare button 510 in the state where Photo Selection Screen 501 in FIG. 7 is displayed, the plurality of images determined to be the consecutively captured photos in FIG. 26 is displayed in a list. The order of arrangement of the images displayed in a list is, for example, the order along the image capturing date.

Further, in the example in FIG. 8, seven photos are displayed in the area 801 but the number of photos is not limited to seven. In a case where the number of photos exceeds the number of photos that can be displayed in the area 801, by a user clicking scroll buttons 803 arranged at both the left and the right ends of the area 801, the displayed photos are slid and it is possible to display another photo that is not displayed so far.

In a case where a user clicks the photo displayed in a list in the area 801, the clicked photo is enlarged and displayed in an area 804. Alternatively, it may also be possible to add the photo displayed in a list in the area 801 to the area 804 by dragging and dropping the photo.

Figure 9:
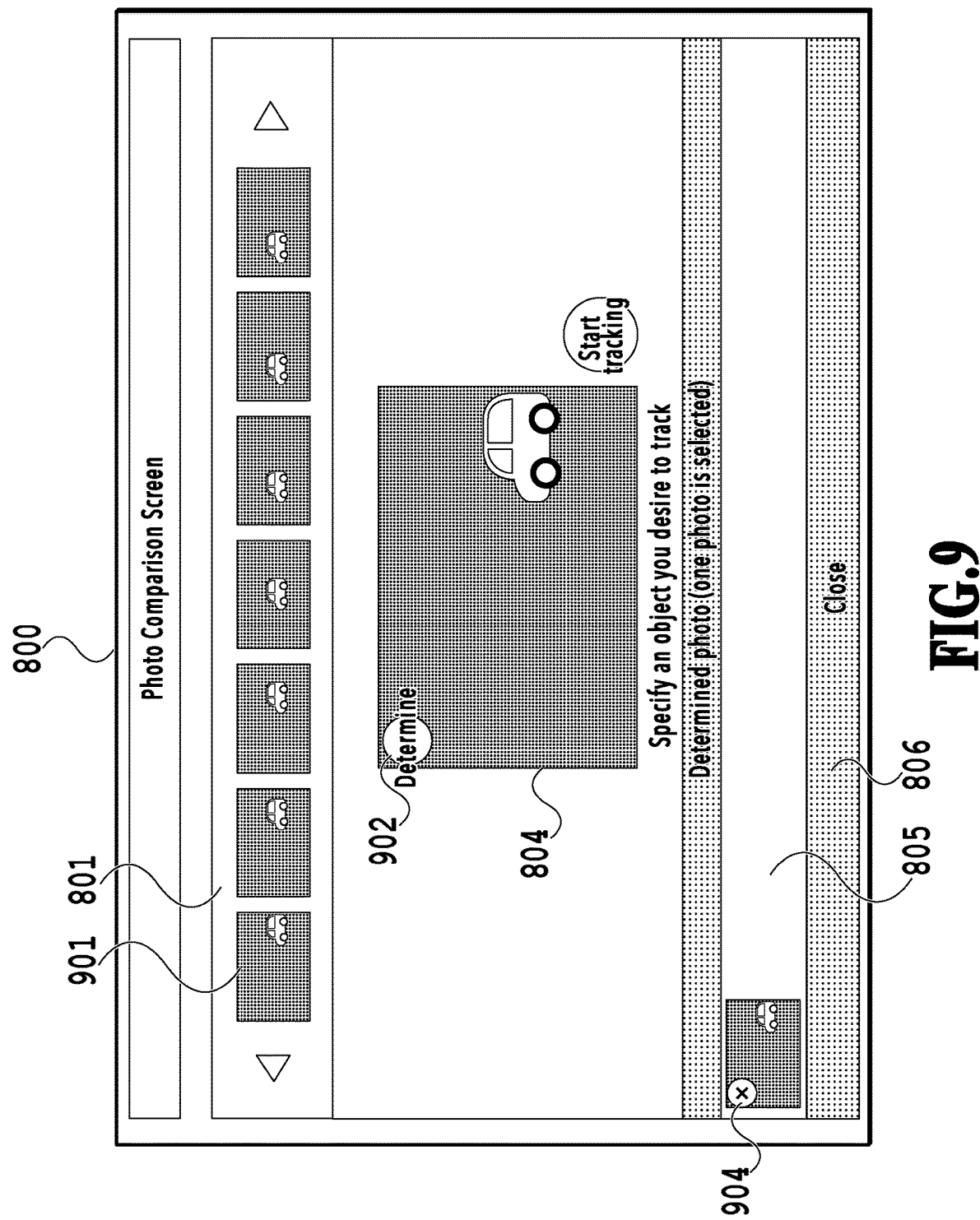
FIG. 9 is a diagram showing an example of the photo comparison screen in the first embodiment.

FIG. 9 shows the state where a photo 901 clicked in the area 801 is enlarged and displayed in the area 804 on Photo Comparison Screen 800. In a case where a user clicks a Determine button 902 in this state, the photo displayed in the area 804 is added to an area 805 as the photo determined to be used for the album. In the example in FIG. 9, the state where one image is determined is shown. The determined image is provided with a checkbox 904 and in a case where a user clicks the checkbox 904, it is possible to cancel the determination. The photo whose determination is cancelled is deleted from the area 805. In the example in FIG. 9, the Determine button 902 is provided to the photo that is enlarged and displayed in the area 804, but it may also be possible to provide the Determine button to each of the photos arranged and displayed side by side in the area 801.

Returning to the flowchart in FIG. 18, at S1802, the album creation application 5 receives specification of an object a user desires to track in the photo enlarged and displayed in the area 804. That is, on the image displayed in the area 804, the specification of an object is received.

Figure 10:
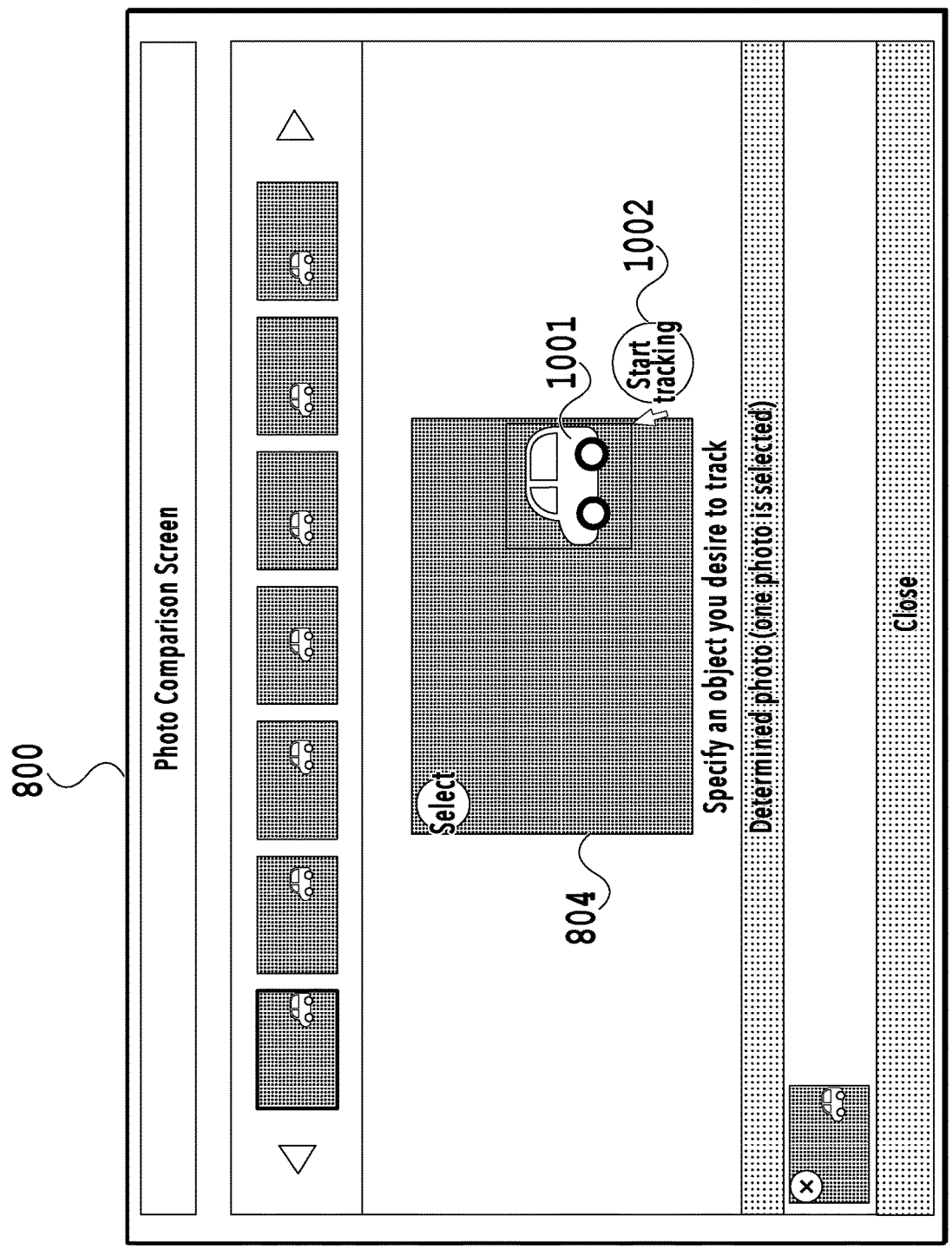
FIG. 10 is a diagram showing an example of the photo comparison screen in the first embodiment.
Figure 13:
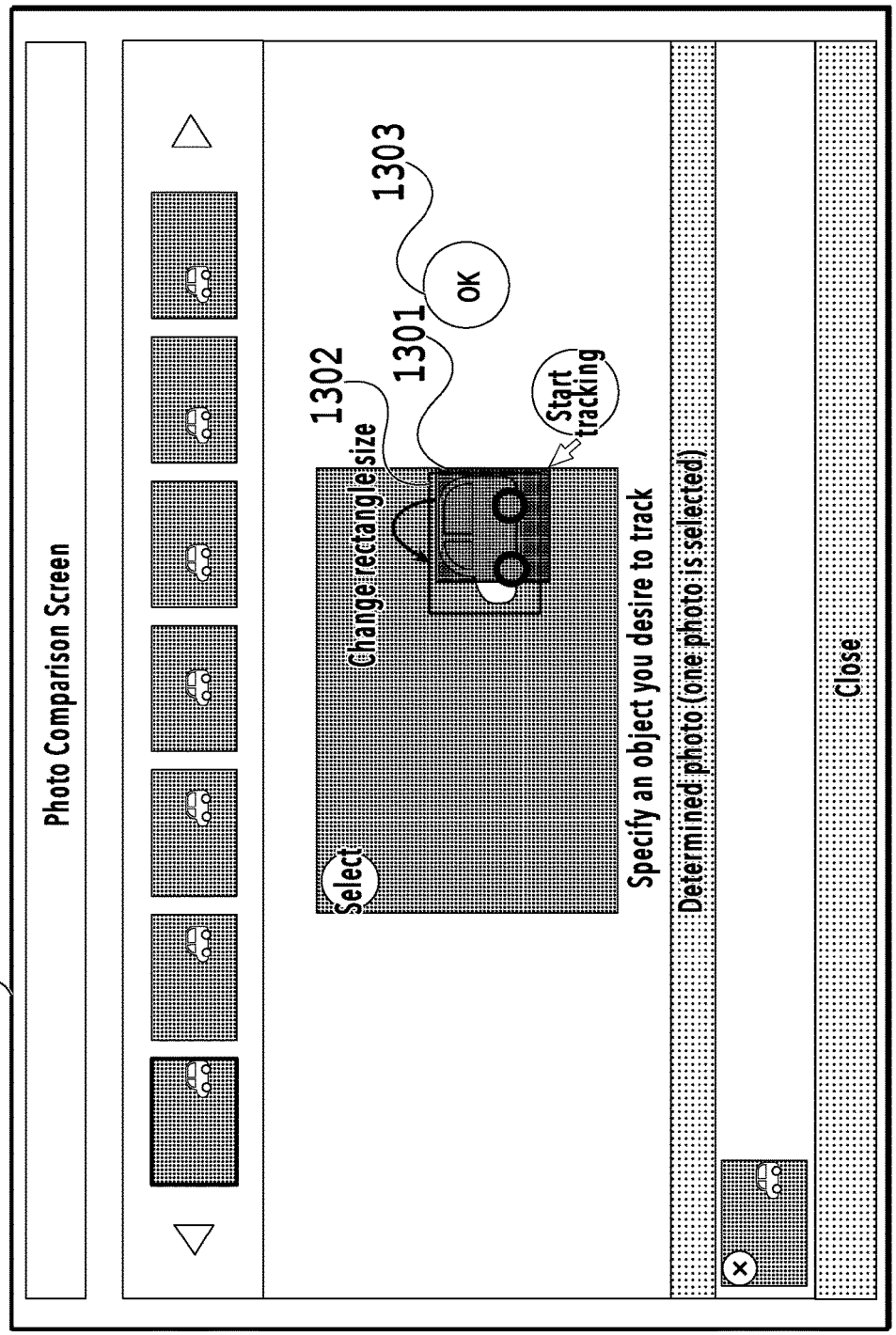
FIG. 13 is a diagram showing an example of the photo comparison screen in the first embodiment.

FIG. 10 shows a rectangular area 1001 in which a car as a tracking-target object is surrounded by a rectangular detection frame in a photo enlarged and displayed in the area 804. In the example in FIG. 10, by a user moving the rectangular detection frame using the input device, such as a mouse, the rectangular area 1001 is set on the image, but it may also be possible to set the rectangular area by changing the shape and size of the detection frame. Specifically, as shown in FIG. 13, it may also be possible to change the size of a rectangular detection frame 1301 and set as a rectangular detection frame 1302, and determine the rectangular area by clicking an OK button 1303. As described above, the shape and size of the detection frame can be changed.

Figure 23:
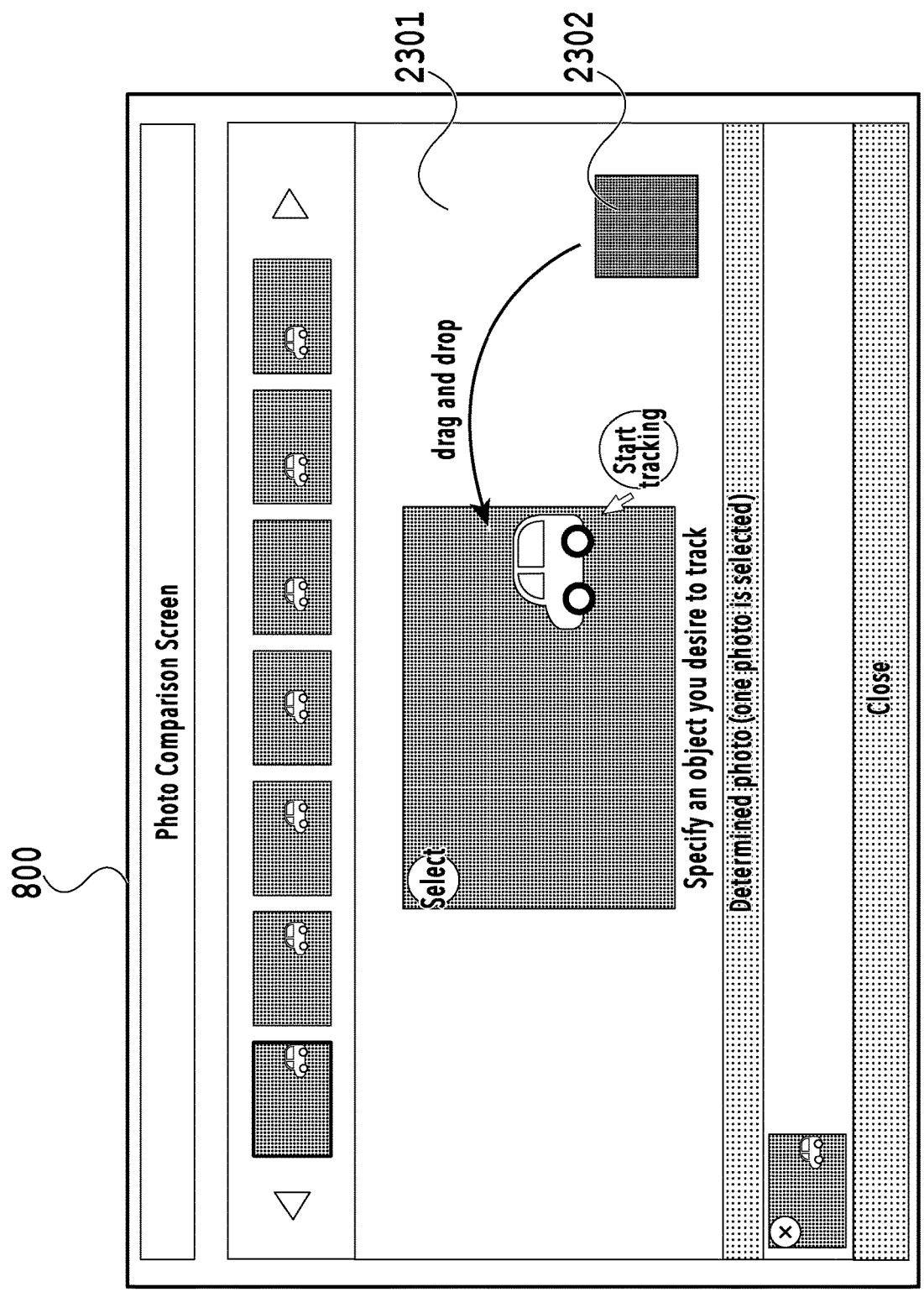
FIG. 23 is a diagram showing an example of the photo comparison screen in the first embodiment.

Further, as another method, as shown in FIG. 23, it may also be possible to display in advance a rectangular area 2302 in an area 2301. It may also be possible for a user to adjust the size of the rectangular area 2302 after moving the rectangular area 2302 onto the photo that is enlarged and displayed.

Figure 24:
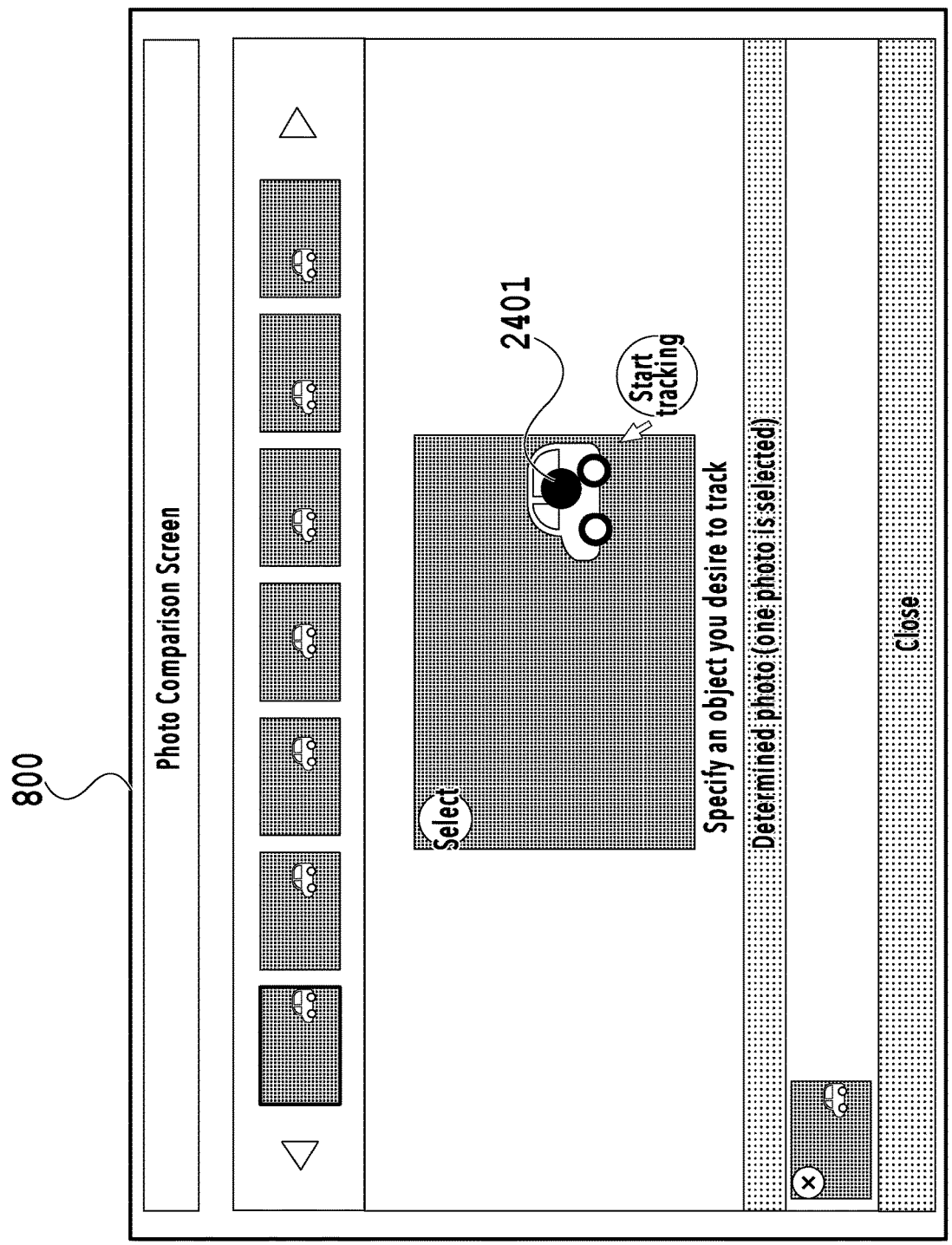
FIG. 24 is a diagram showing an example of the photo comparison screen in the first embodiment.

Furthermore, as another method, as shown in FIG. 24, it may also be possible for a user to specify a tracking-target object with a marker 2401, such as a black circle. In this method, the object including the marker 2401 (here, car) is recognized as the tracking-target object.

Figure 19:
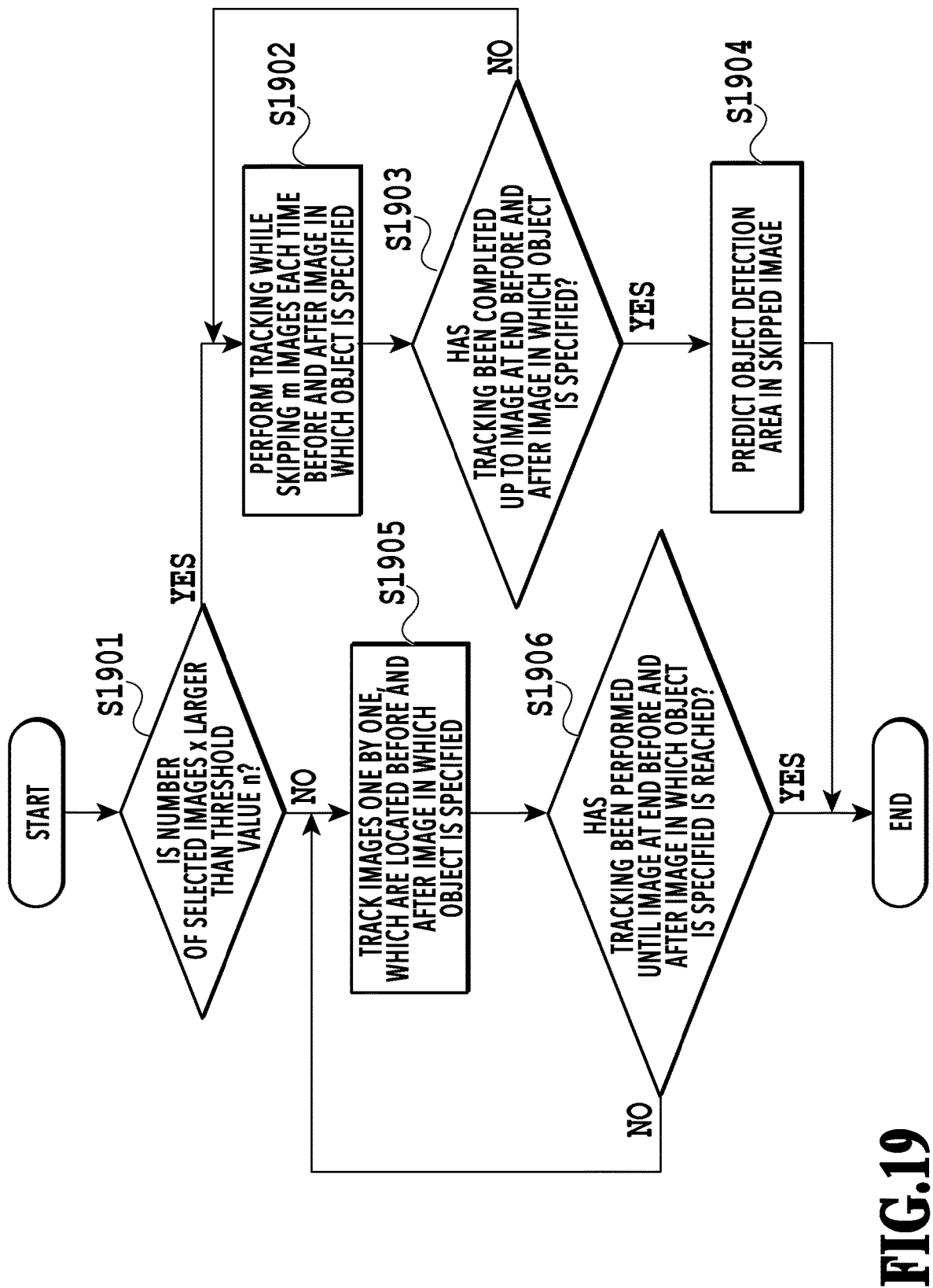
FIG. 19 is a detailed flowchart of the object tracking processing in the first embodiment.

Returning to the flowchart in FIG. 18, at S1803, by a user clicking a Start tracking button 1002 in FIG. 10, the album creation application 5 performs object tracking processing. FIG. 19 shows a detailed flowchart of the object tracking processing at S1803. The object tracking processing is performed by detecting the object included in the tracking area, which is specified at S1802, from the selected images whose checkboxes 504 are checked on Photo Selection Screen 501 shown in FIG. 6 and FIG. 7. For example, in a case where the object is the face of a person, it is possible to detect the object by using the face detection technique.

At S1901, the album creation application 5 compares a number of selected images x with a threshold value n that is set in advance and determines whether the number of selected images x is larger than the threshold value n. There is a possibility that the larger the number of selected images x, the more the processing time of the object tracking processing is prolonged. Consequently, in a case where the number of selected images x is larger than the threshold value n, the processing advances to S1902 in order to reduce the processing time.

At S1902, the album creation application 5 performs the object tracking processing (tracking) while skipping m images each time before and after the image in which the object is specified at S1802 for the selected images displayed side by side in the area 801. Specifically, the album creation application 5 extracts a plurality of images by skipping m images each time for the plurality of comparison-target images (images displayed in a list on the photo comparison screen). Then, the album creation application 5 specifies, among the extracted images, an area whose size is similar to that of the area of the object specified at S1802 in the image selected at S1801 and whose contents of image data are similar.

At this time, as the method of searching for a similar area similar to the area of the above-described object in the tracking-target image, various methods can be used. For example, it is possible to search for a similar area by the block matching method of searching for a similar block between images for each block of a predetermined size (eight pixels×eight pixels, and the like). Specifically, the album creation application 5 divides the area of the above-described object into blocks of the predetermined size and searches for a block whose similarity with each block is higher than or equal to a predetermined value in the tracking-target image. For example, in a case where the difference of the average value of the pixel values (luminance values and the like) of the pixels within the block is within a predetermined value, the similarity is regarded as being higher than or equal to the predetermined value. Then, in the tracking-target image, the area whose size (number of pixels) is the same as that of the area of the above-described object and whose number of blocks whose similarity is determined to be higher than or equal to the predetermined value (or predetermined ratio) is determined to the similar area similar to the area of the above-described object. In a case where the area that can be determined as described above does not exist, it is determined that a similar area does not exist in the tracking-target image, that is, the object specified at S1802 is not detected.

It is possible to employ various methods as the selection method of a comparison-target image for determination of a similar area. For example, the album creation application 5 specifies a similar area in the image adjacent to the selected image selected at S1801 in order of the image capturing time among the tracking-target images extracted by skipping m images each time. Then, by the loop processing including S1903, in another tracking-target image adjacent in terms of the image capturing time to the image in which the similar area is specified, a similar area similar to the specified similar area is specified. That is, in order of the image capturing time of the tracking-target images, with the selected image selected at S1801 as a center, a similar area similar to the object area of the adjacent image is specified sequentially. With this method, the object areas are specified in the images whose image capturing times are comparatively close, and therefore, a change in the size of the object in the image is comparatively small. Because of this, for example, even in a case where the distance between the image capturing apparatus and the object changes in consecutive image capturing, or even in a case where consecutive image capturing is performed while performing a zoom and the like, it is possible to track an object more accurately.

Further, as in the case with S1902, by skipping a predetermined number of target images for which object detection is performed, it is possible to reduce the number of times of detection processing. The value m is set in advance. It may also be possible to sort in advance the selected images in accordance with a predetermined reference, such as the image capturing date. Further, whether or not the object has been detected in each image, that is, whether or not the tracking processing has succeeded is stored.

At S1903, the album creation application 5 determines whether tracking has been completed up to the image at the end before and after the image in which the object is specified among the selected images displayed side by side in the area 801. That is, the processing at S1902 is repeated until the detection-target image reaches the image at the end before and after the image. In a case where the image at the end before and after the image is reached, the processing advances to S1904.

At S1904, the album creation application 5 predicts the object detection area in the skipped image by performing interpolation processing for the skipped image. Between the two photos for which the object tracking has been performed, m images for which tracking has not been performed exist. At this step, the object detection area is determined by performing the interpolation processing for the m images. For example, the object detection area in the m images is determined based on the image capturing dates of the two images for which the object tracking has been performed and the positional information on the detection area in which the object has been detected.

FIG. 28A to FIG. 28C are diagrams explaining the interpolation processing in the present embodiment, which is performed at S1904. It is assumed that the selected images are arranged side by side in order of the image capturing date. Further, it is assumed that the m skipped images exist between the image at the start point and the image at the end point, for which the object tracking has been performed.

FIG. 28A shows a base point (Xs, Ys) in a tracking area 2801 in the image at the start point and a base point (Xe, Ye) in a tracking area 2802 in the image at the end point, which are calculated by the album creation application 5. The album creation application 5 finds dx and dy as the differences in the X-coordinate and the Y-coordinate between the base points.

FIG. 28B shows that three images are skipped between the image at the start point and the image at the end point (that is, m=3). It is assumed that the image capturing date of the image at the start point is ts and the image capturing date of the image at the end point is te. A time difference V is a difference between te and ts. It is assumed that the image capturing date of each image is t0, t1, t2, t3, and t4. Because of this, in FIG. 28B, te is t0 and ts is t4. It is assumed that the moving speed of the tracking area from the image at the start point and the image at the end point is constant. A base point (X, Y) in the tracking area in each image changes in proportion to the time elapsed from the image capturing date of the image at the start point. That is, the offset amount from the base point in the tracking area in the image at the start point is dx multiplied by a ratio of the elapsed time to the entire time (that is, the time difference V). For example, for the first image, the elapsed time is (t1−t0), and therefore, the results of multiplying dx by (t1−t0)/V are the offset of X. This is the same for Y. Consequently, the position of the base point in the tracking area in the first photo is obtained by adding the offset from the position (Xs, Ys) of the base point in the tracking area in the image at the start point, and therefore, the position is (Xs+offset X, Ys+offset Y).

It is possible to make use of the amounts of change, which are obtained by simply dividing dx and dy by m, to find the position of the base point in the tracking area in each image in a case where the interval of the image capturing dates of the m images is equal. However, as described above, by performing interpolation processing, it is made possible to find the position of the base point in the tracking area in each image even in a case where the interval of the image capturing dates of the m images is not equal.

FIG. 28C shows an offset calculation formula of the position of the base point in the tracking area in each image in a case where m is three. As described above, it is possible to calculate the offset of the position of the base point in the tracking area in each image.

Returning to the flowchart in FIG. 19, at S1901, in a case where the number of selected images x is less than or equal to the threshold value n, the processing advances to S1905.

At S1905, the album creation application 5 tracks the images one by one, which are located before and after the image in which the object is specified at S1802, among the selected images displayed side by side in the area 801. The tracking method is the same as that at S1902. That is, the album creation application 5 performs the tracking processing for all the selected images other than the image in which the object is specified. Further, as in the case with S1902, in each image, whether or not the object has been detected, that is, whether or not the tracking processing has succeeded is stored.

At S1906, the album creation application 5 determines whether all the images located before and after the image in which the object is specified among the selected images displayed side by side in the area 801 have been tracked. That is, the album creation application 5 repeats the processing at S1905 until the detection-target image reaches the image at the end before and after the image. In a case where the tracking for all the image has been completed, the processing is terminated.

As explained above, according to the object tracking processing in the present embodiment, it is possible to determine the tracking area in all the selected images. Further, in a case where the number of selected images is larger than a predetermined number, it is possible to reduce the processing time by skipping the tracking processing for a predetermined number of images and predicting and determining the tracking area by performing the interpolation processing.

Returning to FIG. 18, at S1804, the album creation application 5 displays the tracking results of the object tracking processing.

Figure 20:
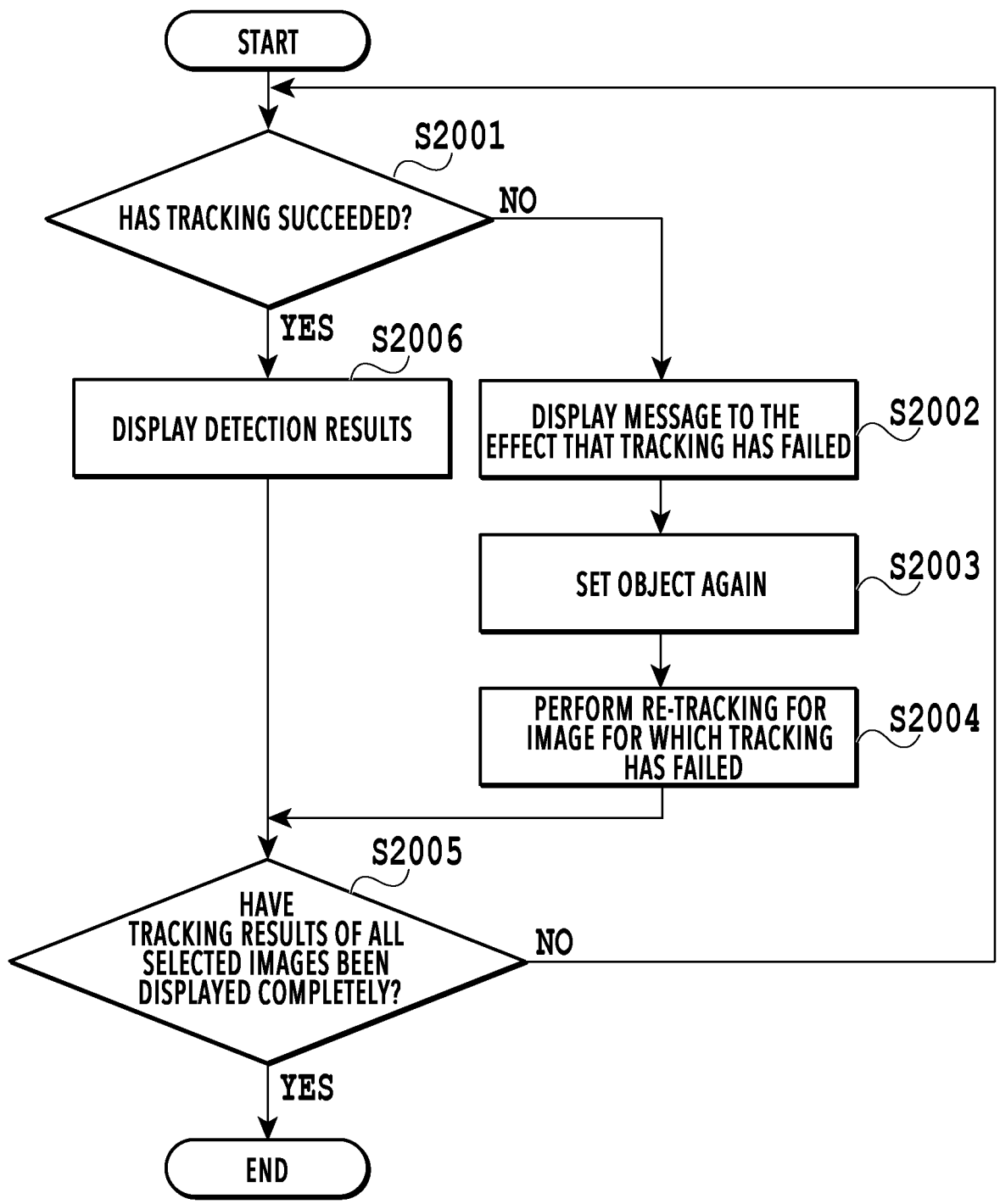
FIG. 20 is a detailed flowchart of tracking results display processing in the first embodiment.

FIG. 20 shows a detailed flowchart of the tracking results display processing at S1804.

At S2001, the album creation application 5 determines whether or not the object tracking (that is, object detection) for one selected image has succeeded. In a case where the tracking has succeeded, the processing advances to S2006. On the other hand, in a case where the tracking has failed, the processing advances to S2002.

Figure 11:
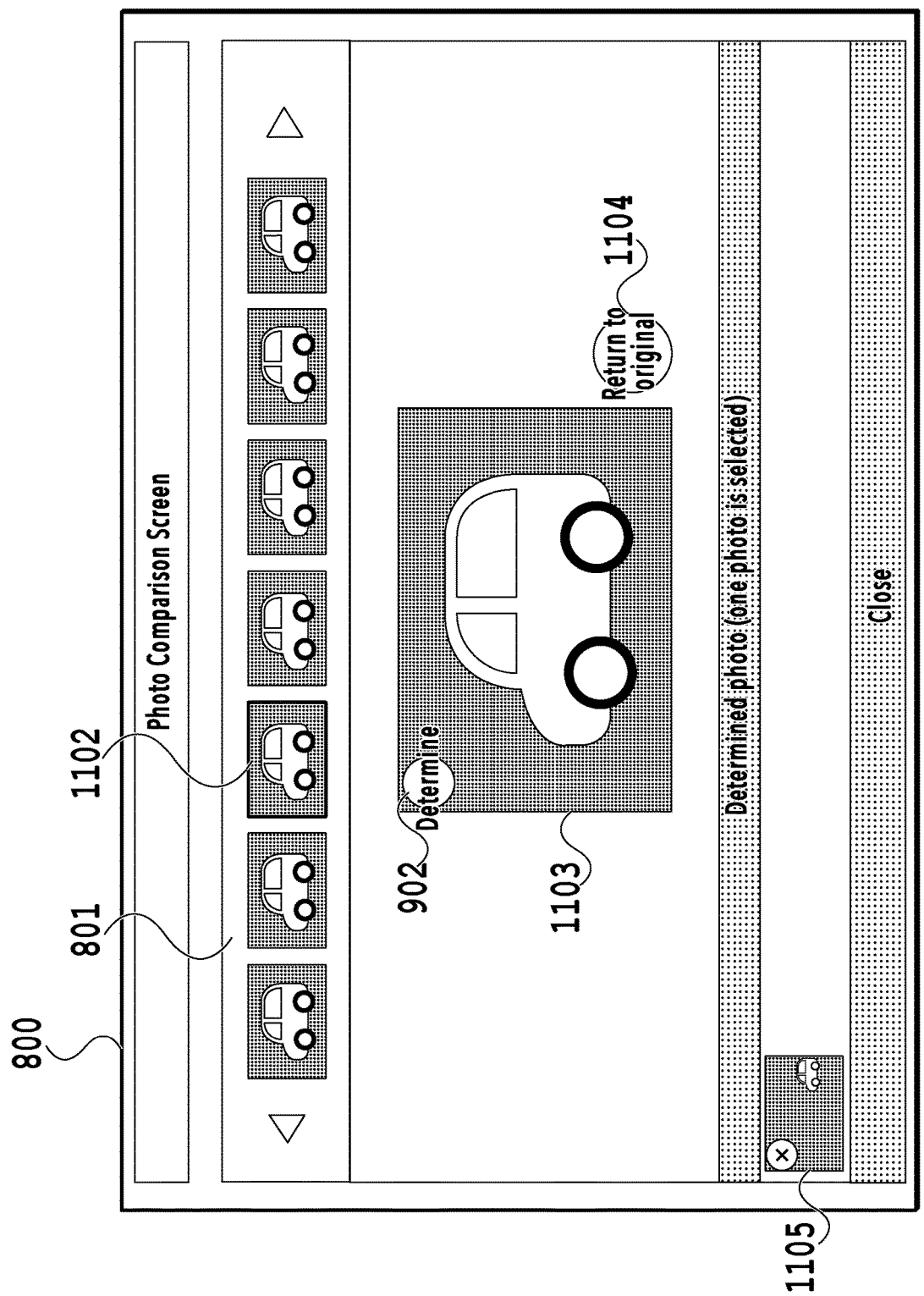
FIG. 11 is a diagram showing an example of the photo comparison screen in the first embodiment.

At S2006, the album creation application 5 crops and displays the detected tracking area in the area 801 on Photo Comparison Screen 800. FIG. 11 shows an example of Photo Comparison Screen 800 that displays the detection results of the tracking area. On Photo Comparison Screen 800, to the area 801, a cropped image 1102 of the detected tracking area is added and displayed side by side together with the other cropped images. In a case where a user selects the cropped image 1102, the selected cropped image is enlarged and displayed in an area 1103. In a case where a user clicks the Determine button 902, the image corresponding to the selected cropped image is added to an area 1105. Due to this, it is possible to determine the photo a user desires to include in the album among the similar photos (that is, selected images). Further, a button 1104 in the area 1103 is a button for returning the display of the cropped image to the original display. In a case where a user clicks the button 1104, Photo Comparison Screen 800 returns to the state in FIG. 9 and in the area 801, the photo 901 of the original size, which is not cropped, is displayed. That is, the specification of the object and the detection results are reset.

Next, at S2005, the album creation application 5 determines whether the tracking results of all the selected images have been displayed completely.

Next, the processing in a case where it is determined that the object tracking has failed at S2001 is explained.

At S2002, the album creation application 5 displays a message to the effect that the object tracking has failed along with the photo for which the object tracking has failed.

At S2003, the album creation application 5 receives a user input for setting an object again on the photo for which the object tracking has failed.

At S2004, the album creation application 5 tracks the object that is set again (that is, re-tracking) in the photo for which the object tracking has failed and displays the tracking results. Normally, in a case where the object tracking fails in a certain image among the selected images, the object tracking will also fail in subsequent images. Consequently, re-tracking is performed for all the remaining images among the selected images.

Figure 21:
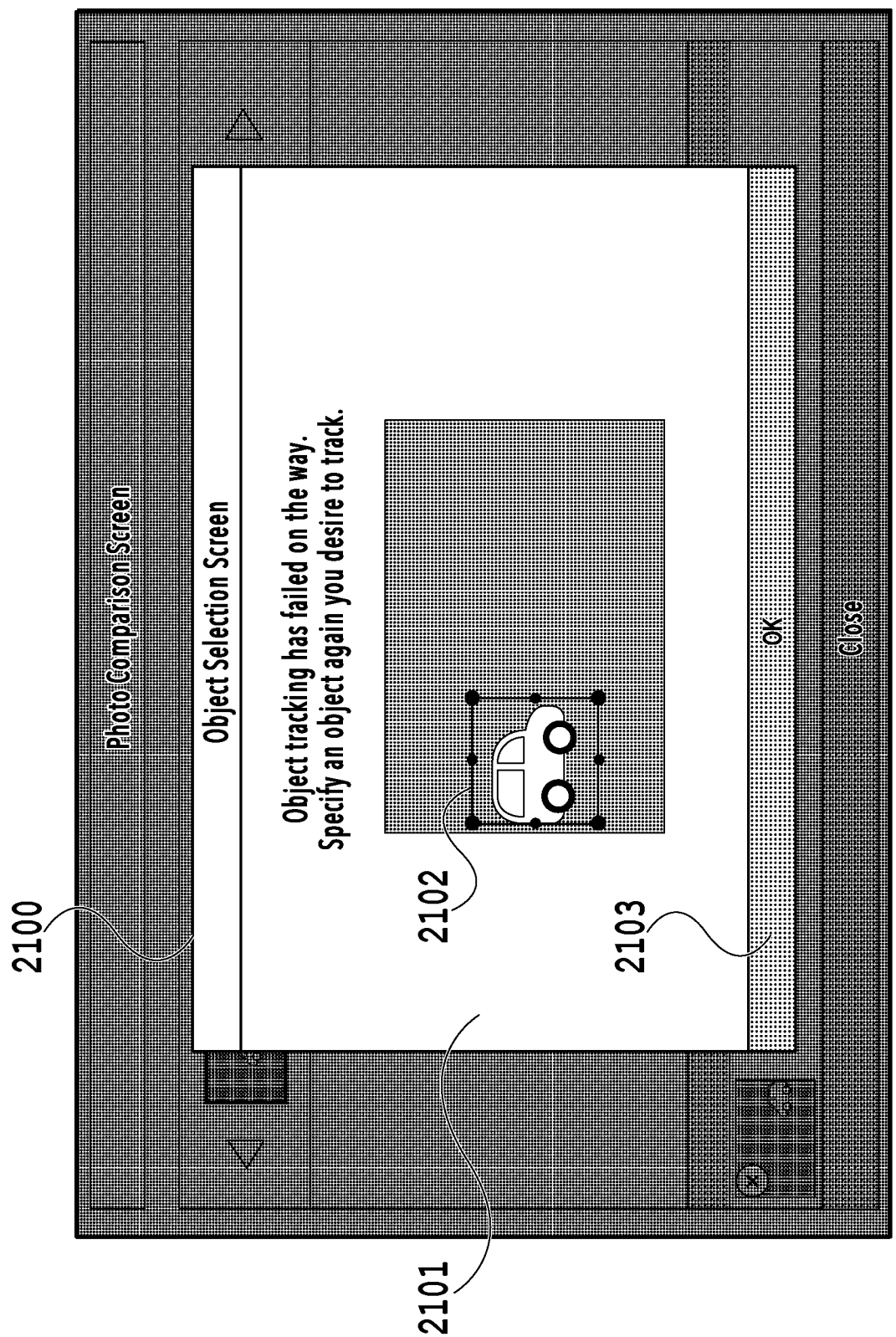
FIG. 21 is a diagram showing an example of an object selection screen in the first embodiment.

FIG. 21 shows an example of an object selection screen for setting an object again. In an area 2101 on Object Selection Screen 2100, along with the photo for which the object tracking has failed, a message to the effect that the object tracking has failed is displayed. A user sets a tracking area 2102 again, which indicates the object, and clicks an OK button 2103. In accordance with the operation of the user, the album creation application 5 tracks the object that is set again from the remaining photos for which the object tracking has failed.

Figure 22:
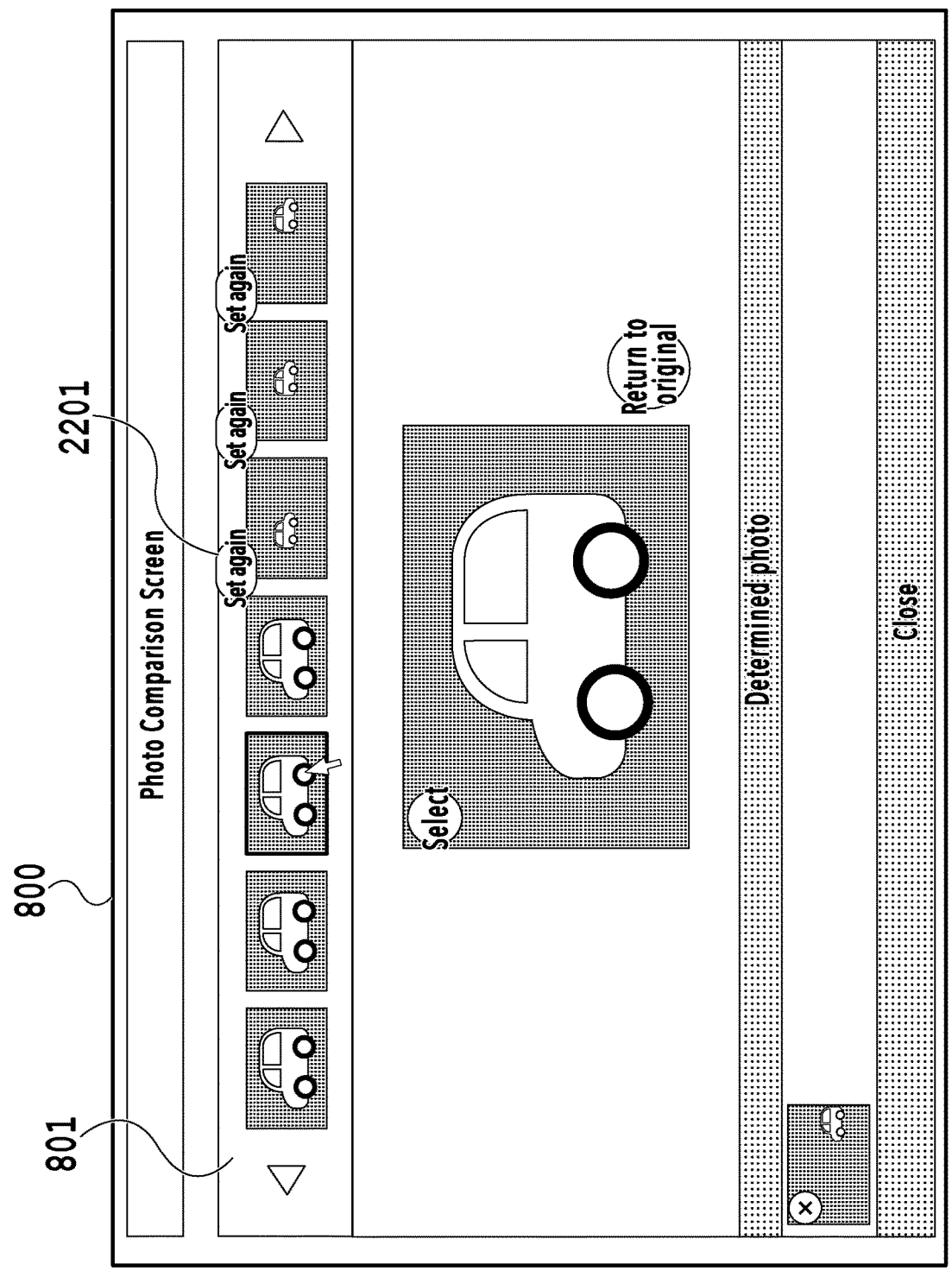
FIG. 22 is a diagram showing an example of the photo comparison screen in the first embodiment.

FIG. 22 shows an example of Photo Comparison Screen 800 that displays the tracking results of the object that is set again. In the area 801, in the image in which the object that is set again has been detected, a Set again mark 2201 is displayed. In place of the Set again mark 2201, for example, it may also be possible to display each image in which the object that is set again has been detected by surrounding each image by a frame. That is, what is required is to enable a user to recognize that the image is an image in which the object that is set again has been detected.

In a case where the re-tracking at S2004 is completed, the processing advances to S2005 described above.

As above, the display processing of the tracking results at S1804 in FIG. 18 is performed.

As explained above, according to the present embodiment, by enlarging and displaying the object specified by a user in each of the similar photos, it is possible to make it easier for a user to select a photo intended by a user from among a plurality of photos. Further, in a case where there are a large number of similar photos, by performing the object tracking processing while skipping a predetermined number of photos, it is possible to reduce the processing time. Further, it is made possible to find the tracking area of each of the skipped photos by the interpolation processing even in a case where the interval of the image capturing date of each photo is not equal. Furthermore, in a case where the tracking fails, the message to that effect is displayed on the screen and at the same time, it is made possible to perform the tracking processing by a user specifying an object again. The photo for which the tracking processing has been performed again is displayed in such a manner that a user can recognize that the object is set again.

In the example in FIG. 11, in order to enhance the area of the object in the image more than the other areas, the area of the object is enlarged and displayed in the area 1103. However, the enhancement method is not limited to this and for example, it may also be possible to display a frame in the area of the object as well as displaying the entire image in the area 1103. Alternatively, for example, it may also be possible to superimpose a gray, translucent mask image on the areas other than the area of the object as well as displaying the entire image. That is, it may also be possible to enhance the area of the object as a result of making less conspicuous the areas other than the area of the object Further, in the above embodiment, the example is shown in which the display shown in FIG. 5 and the display of the object area shown in FIG. 11 are performed in the image selection at S302 before the page layout at S304 in FIG. 3. However, the example is not limited to this and for example, the selection of an image and the layout of the image in a template may be performed automatically without the user operation. Then, at the time of editing of the automatically laid out album, the displays shown in FIG. 5 and FIG. 11 may be performed by the processing at S302 at the time of the selection of an image with which the laid-out image is replaced.

Second Embodiment

In a second embodiment, another aspect relating to the display of a similar image is explained. Specifically, the second embodiment relates to the screen that is displayed at each step of the flowchart in FIG. 18 described above. Explanation of the same configuration and processing as those of the first embodiment is omitted.

Figure 12:
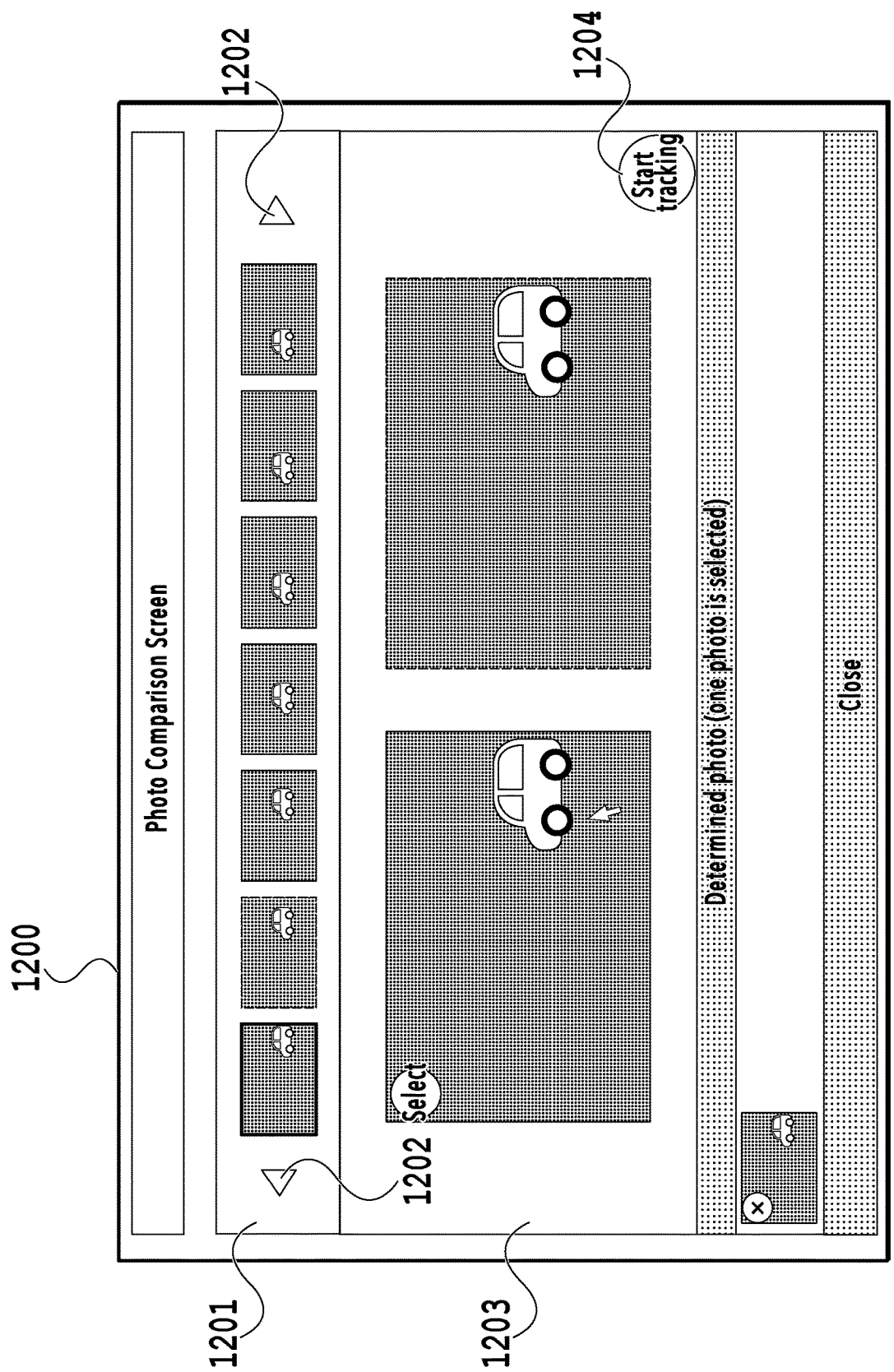
FIG. 12 is a diagram showing an example of a photo comparison screen in a second embodiment.

FIG. 12 shows an example of Photo Comparison Screen 1200 in the present embodiment. This Photo Comparison Screen 1200 is displayed at S1801 in FIG. 18. An area 1201 displays the images side by side, which are selected on Photo Selection Screen in FIG. 6 or FIG. 7. In a case where a user clicks scroll buttons 1202 arranged at both the left and the right ends of the area 1201, the displayed images are slid and another image that is not displayed so far is displayed in the area 1201. In a case where a user selects an image in the area 1201, the selected image is enlarged and displayed in an area 1203. The area 1203 enlarges and displays two images selected by a user side by side. Specifically, the image selected first in the area 1201 is displayed on the left side in the area 1203. Next, in a case where another image is selected in the area 1201, the image is displayed on the right side in the area 1203. The order of displaying the left and right images may be reverse. Further, in a case where the next image is selected in the area 1201 in the state where the two images are displayed in the area 1203, one of the left and right images in the area 1203 is replaced with the image and the image is enlarged and displayed. Which of the left and right images is replaced with the next image, which is then enlarged and displayed, is determined by the method as below. First, a user clicks one of the left and right images in the area 1203 and brings the image into the selected state. Next, in a case where a user selects an image in the area 1201, the image in the selected state in the area 1203 is replaced with the image selected in the area 1201. As described above, according to the present embodiment, it is possible to compare two images by enlarging and displaying them side by side. The number of images displayed in the area 1203 is not limited two and three or more images may be displayed.

In a case where a user clicks the image displayed in the area 1203, the processing advances to S1802 in FIG. 18 and the screen makes the transition to an object selection screen.

Figure 25:
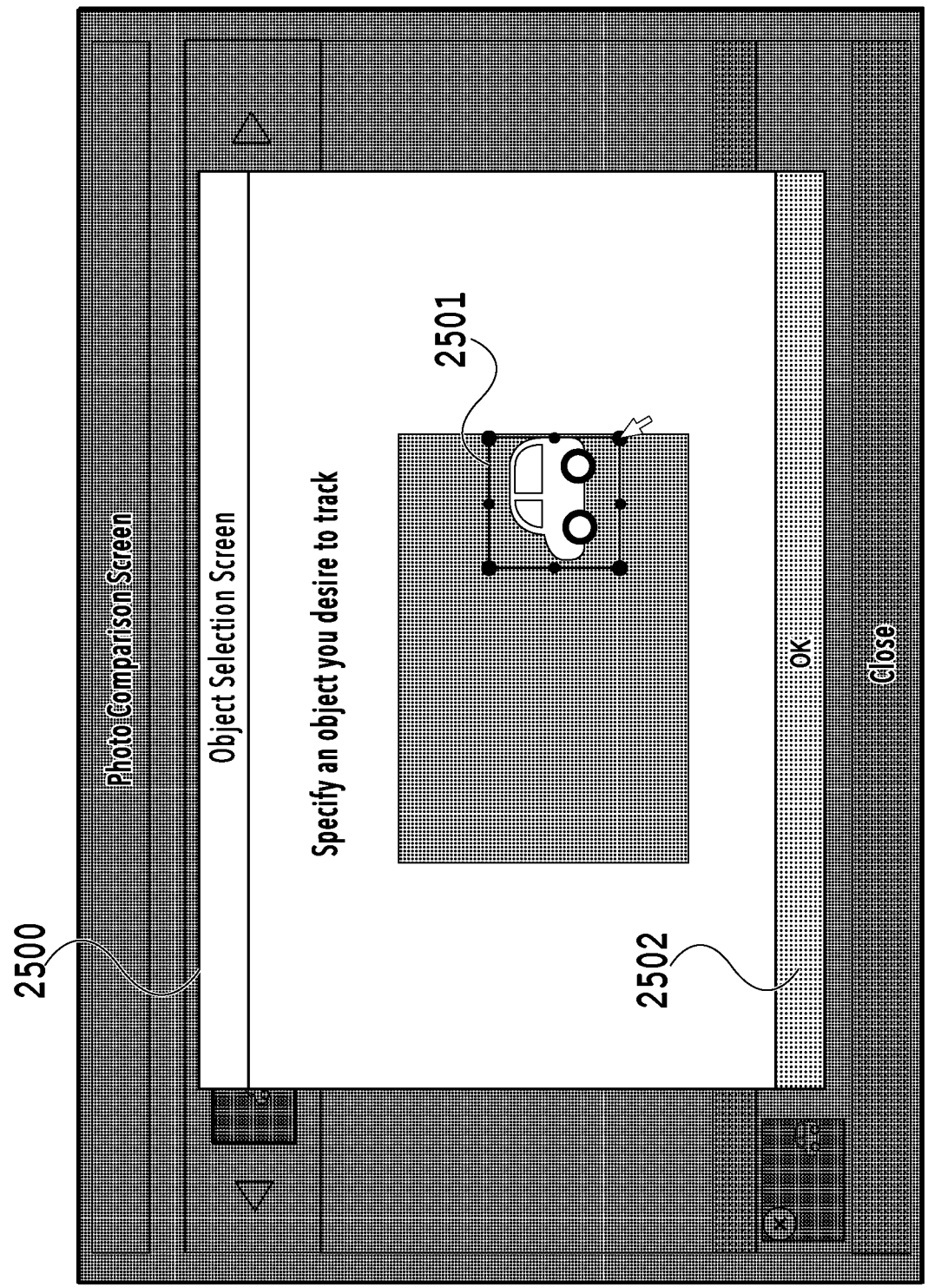
FIG. 25 is a diagram showing an example of an object selection screen in the second embodiment.

FIG. 25 shows an example of Object Selection Screen 2500 in the present embodiment. This Object Selection Screen 2500 is displayed at S1802 in FIG. 18. A user sets a tracking area 2501 to an object a user desires to track and clicks an OK button 2502. After that, the screen returns to Photo Comparison Screen 1200 in FIG. 12.

In a case where a user clicks a Start tracking button 1204 on Photo Comparison Screen 1200 in FIG. 12, the album creation application 5 performs object tracking processing by taking the selected image in FIG. 12 as a target. This corresponds to S1803 in FIG. 18.

Figure 14:
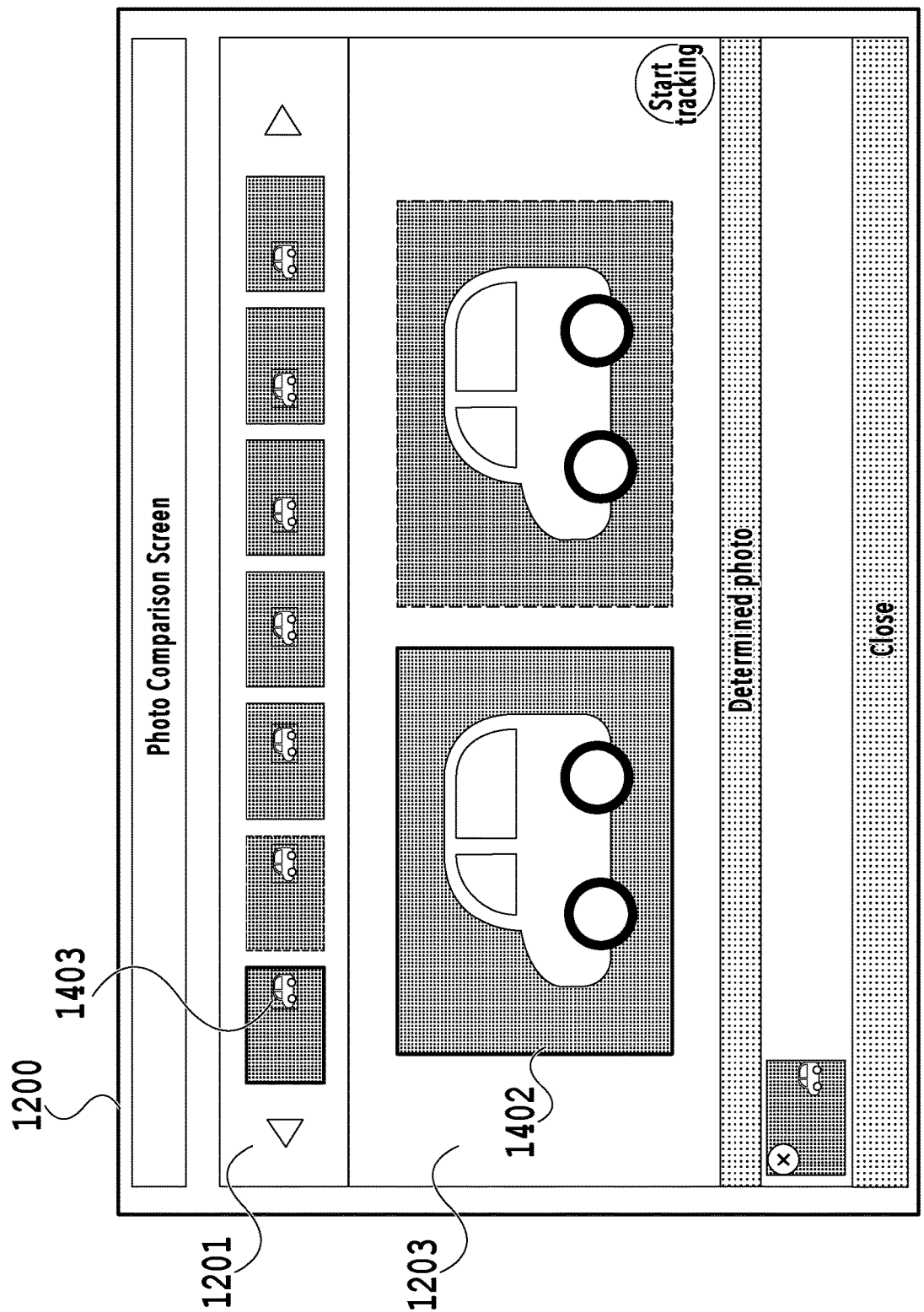
FIG. 14 is a diagram showing an example of the photo comparison screen in the second embodiment.

FIG. 14 shows an example of Photo Comparison Screen 1200 that displays the detection results of the tracking area in the present embodiment. This screen is displayed at S1804 in FIG. 18, more specifically, at S2006 in FIG. 20. In each image displayed in the area 1201, the detected tracking area is indicated by a detection results frame 1403. Further, in the area 1203, a tracking area 1402 detected in two images is enlarged and displayed. The area 1201 displays the image before being enlarged (that is, the entire image), and therefore, it is possible for a user to check the entire composition of the image.

Figure 15:
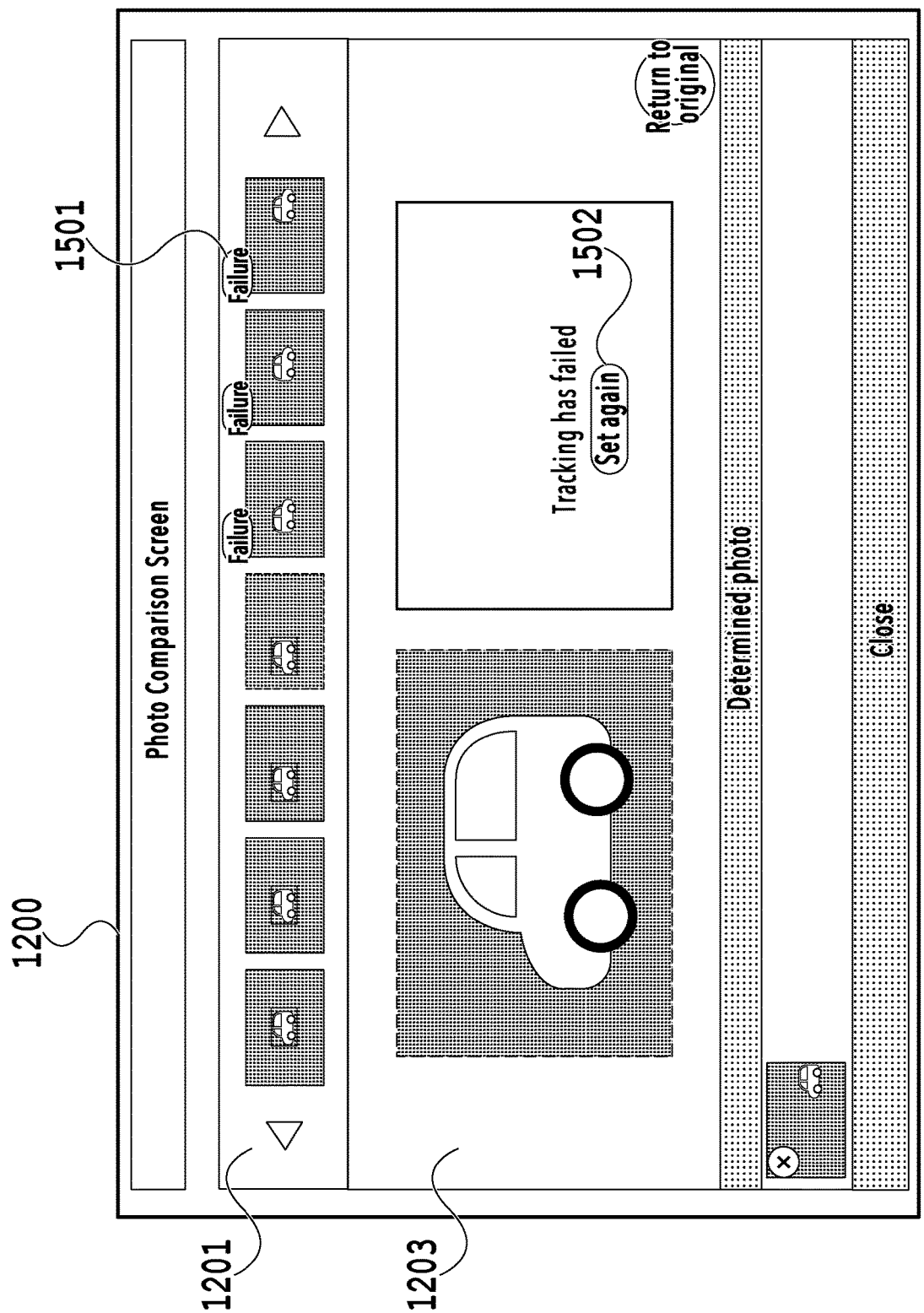
FIG. 15 is a diagram showing an example of the photo comparison screen in the second embodiment.

FIG. 15 shows an example of Photo Comparison Screen 1200 in a case where the object tracking has failed. This screen is displayed at S1804 in FIG. 18, more specifically, at S2002 in FIG. 20. In the area 1201, a Failure mark 1501 is displayed in the image for which the object tracking has failed. In a case where a user selects the image for which the object tracking has failed in the area 1201, the message to the effect that the object tracking has failed is displayed in the area 1203. In a case where a user clicks a Set again button 1502, the screen makes the transition to an object set-again screen.

Figure 16:
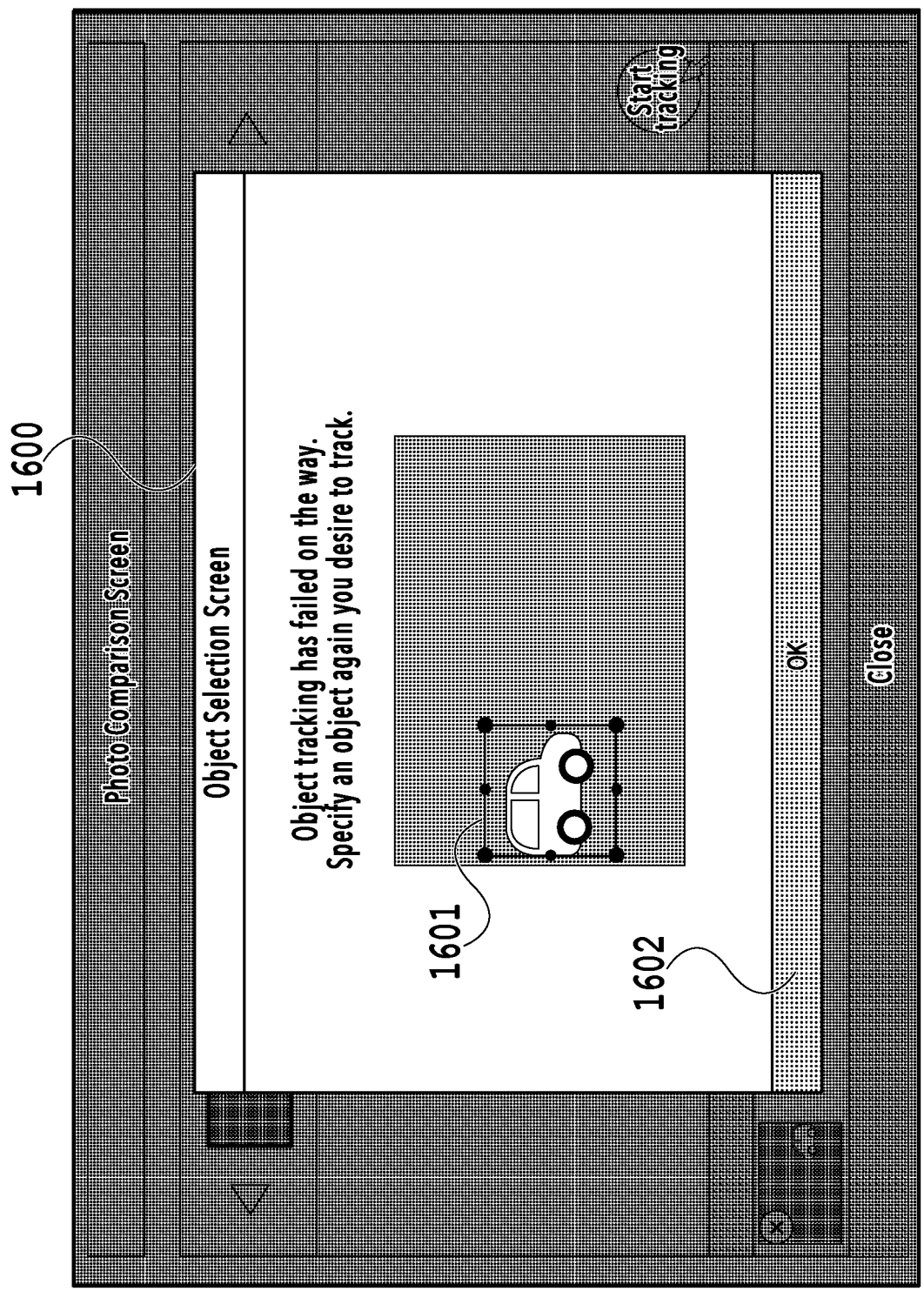
FIG. 16 is a diagram showing an example of an object selection screen in the second embodiment.

FIG. 16 shows an example of Object Selection Screen 1600 for setting an object again. On Object Selection Screen 1600 in FIG. 16, a user sets a tracking area 1601 again and clicks an OK button 1602. Net, the album creation application 5 tracks the object that is set again from the image for which the object tracking has failed before the object is set again.

Figure 17:
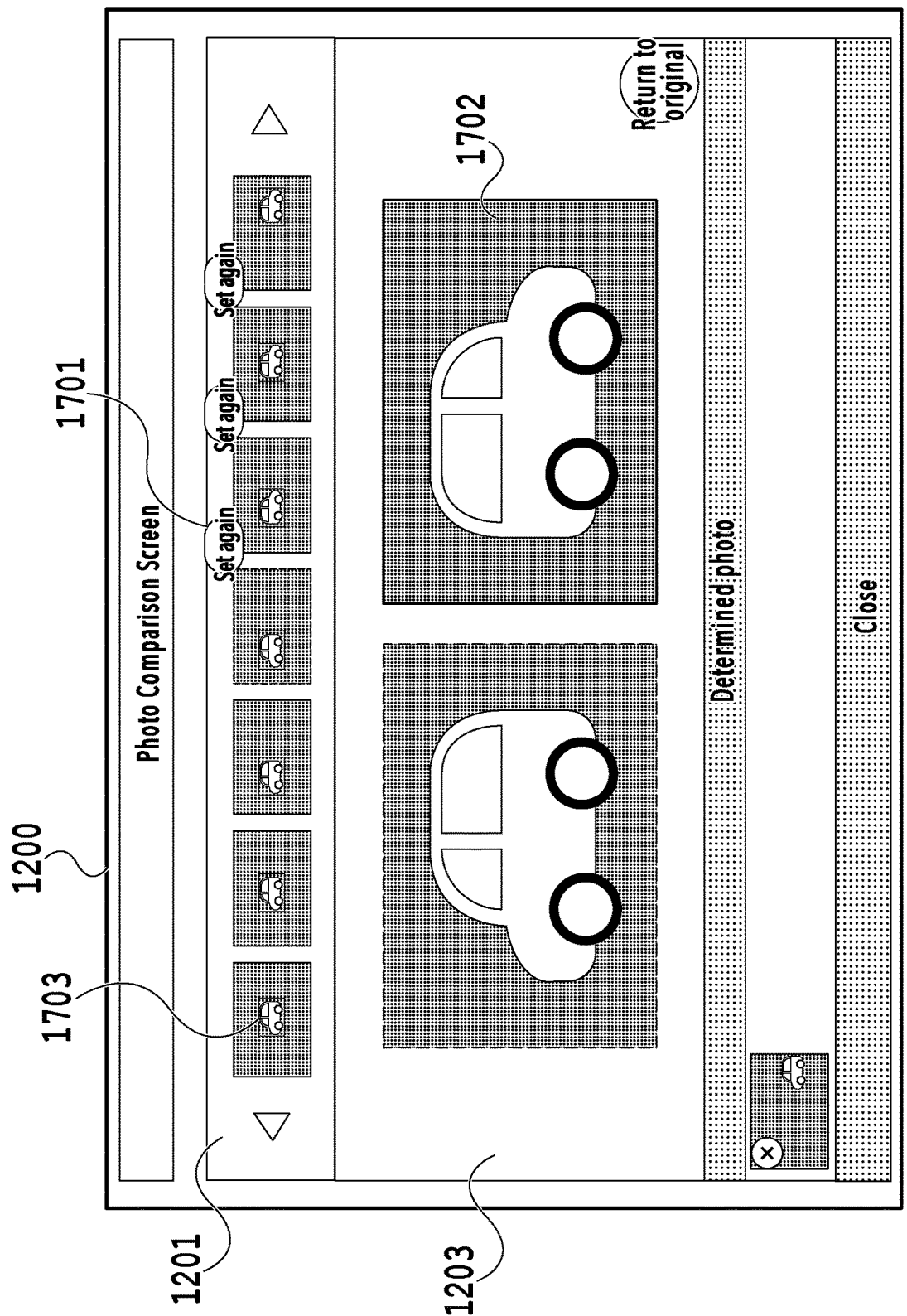
FIG. 17 is a diagram showing an example of the photo comparison screen in the second embodiment.

FIG. 17 shows an example of Photo Comparison Screen 1200 that displays the tracking results of the object that is set again. In the image displayed in the area 1201, a detection results frame 1703 is displayed. Further, in the image in which the object that is set again has been detected, a Set again mark 1701 is displayed. In the area 1203, a detected tracking area 1702 is enlarged and displayed.

As explained above, in the present embodiment, the tracking area is enlarged and displayed, and therefore, it is possible for a user to compare details. Further, the photo before being enlarged is displayed on the same screen, and therefore, it is also possible for a user to check the composition of the photo of interest.

As explained above, according to the present embodiment, it is possible to enlarge and display two images side by side among the similar photos, and therefore, it is made easier to compare the images and it is possible to make easier the photo selection by a user. Further, the photos before and after being enlarged are displayed on the same screen, and therefore, it is possible for a user to compare the images after being enlarged while checking the entire composition of the photos.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to one embodiment of the present invention, it is possible to make it easier for a user to select an intended image from among a plurality of images.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-067752, filed Mar. 29, 2019, which is hereby incorporated by reference herein in its entirety.

What is claimed is:

1. An information processing apparatus comprising:
   at least one processor causing the information processing apparatus to perform:
   (1) receiving input for setting an object in one image of a plurality of images;
   (2) detecting the object from each of the plurality of images based on the input; and
   (3) causing a display screen to display an area corresponding to the detected object of each of the plurality of images so that the area is emphasized more than the other areas in each of the plurality of images,
   wherein, in a case where the object detection has failed, an input for setting the object is received again, whereby the object is detected from an image for which the object detection has failed, and
   wherein a mark indicating that the object that is set again has been detected is displayed in an image in which the object that is set again has been detected.

2. The information processing apparatus according to claim 1, wherein the display screen displays a first area displaying the plurality of images in a list and a second area in which an area is enlarged and displayed, which corresponds to the object in an image selected from the first area by the user among images selected from the first area.

3. The information processing apparatus according to claim 2, wherein the display screen:
   displays, in a list, a cropped image of a detection area of the object in each image in the first area; and
   enlarges and displays the cropped image selected from the first area in the second area.

4. The information processing apparatus according to claim 2, wherein the display screen:
   displays, in a list, an entire image of each image in the first area; and
   enlarges and displays a detection area of the object in an image selected from the first area in the second area.

5. The information processing apparatus according to claim 4, wherein the display screen enlarges and displays side by side detection areas of the objects in a plurality of images selected from the first area in the second area.

6. The information processing apparatus according to claim 4, wherein the display screen displays a detection results frame indicating a detection area of the object in each image displayed in the first area.

7. The information processing apparatus according to claim 1, wherein the display screen displays a message to the effect that the object detection has failed in a case where the object detection has failed.

8. The information processing apparatus according to claim 1, wherein the detecting detects the object while skipping a predetermined number of images.

9. The information processing apparatus according to claim 8, wherein the detecting determines a detection area of the object of the skipped image by performing interpolation processing based on the image in which the object has been detected, which is located before and after the skipped image.

10. The information processing apparatus according to claim 9, wherein the interpolation processing is processing to predict a detection area of the object in the skipped image based on an image capturing date of the image in which the object has been detected, which is located before and after the skipped image, and positional information on the detection area of the object.

11. The information processing apparatus according to claim 1, wherein the plurality of images includes images of consecutively captured photos.

12. The information processing apparatus according to claim 11, wherein the images of the consecutively captured photos are specified based on image capturing dates of the plurality of images.

13. The information processing apparatus according to claim 1, wherein the receiving receives specification of the object specified by the user operating a detection frame displayed on a screen or a marker.

14. The information processing apparatus according to claim 13, wherein the detection frame can be changed in shape or size.

15. The information processing apparatus according to claim 1, wherein one of the plurality of images is selected in response to an instruction by a user after the emphasized area is displayed.

16. A non-transitory computer-readable storage medium storing a program for causing a computer comprising at least one processor to function as an information processing apparatus that performs a method comprising:
receiving input for setting an object in one image of a plurality of images;
detecting the object from each of the plurality of images based on the input; and
causing a display screen to display an area corresponding to the detected object of each of the plurality of images so that the area is emphasized more than the other areas in each of the plurality of images,
wherein, in a case where the object detection has failed, an input for setting the object is received again, whereby the object is detected from an image for which the object detection has failed, and
wherein a mark indicating that the object that is set again has been detected is displayed in an image in which the object that is set again has been detected.

17. A method comprising:
receiving input for setting an object in one image of a plurality of images;
detecting the object from each of the plurality of images based on the input; and
causing a display screen to display an area corresponding to the detected object of each of the plurality of images so that the area is emphasized more than the other areas in each of the plurality of images,
wherein, in a case where the object detection has failed, an input for setting the object is received again, whereby the object is detected from an image for which the object detection has failed, and
wherein a mark indicating that the object that is set again has been detected is displayed in an image in which the object that is set again has been detected.

* * * * *